(12) United States Patent
Suzuki et al.

(10) Patent No.: US 12,443,393 B2
(45) Date of Patent: Oct. 14, 2025

(54) ELECTRONIC CONTROL DEVICE AND STEERING SYSTEM

(71) Applicant: DENSO CORPORATION, Kariya (JP)

(72) Inventors: Takahiro Suzuki, Kariya (JP); Masaya Taki, Kariya (JP); Tomofumi Yoshida, Kariya (JP); Motoaki Kataoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 248 days.

(21) Appl. No.: 18/061,135

(22) Filed: Dec. 2, 2022

(65) Prior Publication Data

US 2023/0101263 A1 Mar. 30, 2023

Related U.S. Application Data

(63) Continuation of application No. PCT/JP2021/023943, filed on Jun. 24, 2021.

(30) Foreign Application Priority Data

Jul. 20, 2020 (JP) .................................. 2020-123883

(51) Int. Cl.
G06F 7/499 (2006.01)
B62D 5/04 (2006.01)
G06F 7/485 (2006.01)
H02P 27/06 (2006.01)

(52) U.S. Cl.
CPC ............. *G06F 7/499* (2013.01); *B62D 5/046* (2013.01); *B62D 5/0481* (2013.01); *G06F 7/485* (2013.01); *G06F 7/49905* (2013.01); *H02P 27/06* (2013.01)

(58) Field of Classification Search
CPC ....... B62D 5/046; B62D 5/0481; G06F 7/483; G06F 7/485; G06F 7/499; G06F 7/49905; H02P 27/06
See application file for complete search history.

(56) References Cited

U.S. PATENT DOCUMENTS

| 2001/0005808 A1 | 6/2001 | Kawai et al. |
| 2003/0135322 A1 | 7/2003 | Koto et al. |
| 2019/0334466 A1 | 10/2019 | Arai |

FOREIGN PATENT DOCUMENTS

| JP | H04-268931 A | 9/1992 |
| JP | 2004-278483 A | 10/2004 |
| JP | 2010-266976 A | 11/2010 |
| JP | 2011-164814 A | 8/2011 |
| JP | 2017-229156 A | 12/2017 |

*Primary Examiner* — Mark L. Greene
(74) *Attorney, Agent, or Firm* — Maschoff Brennan

(57) ABSTRACT

An electronic control device is provided with a plurality of calculation blocks that calculate floating-point data. The electronic control device includes a storage that stores calculation data items of the plurality of calculation blocks. The electronic control device calculates a command value of a control amount in a control target based on the calculation data items of the plurality of calculation blocks.

12 Claims, 16 Drawing Sheets

ELECTRONIC CONTROL DEVICE AND STEERING SYSTEM

CROSS REFERENCE TO RELATED APPLICATIONS

The present application is a continuation application of International Patent Application No. PCT/JP2021/023943 filed on Jun. 24, 2021, which designated the U.S. and claims the benefit of priority from Japanese Patent Application No. 2020-123883 filed on Jul. 20, 2020. The entire disclosures of all of the above applications are incorporated herein by reference.

TECHNICAL FIELD

The present disclosure relates to an electronic control device and a steering system.

BACKGROUND

An electronic control device that calculates floating-point data has been known. In a case of a calculation using floating-point data, calculation data using non-numerical data is non-numerical. Therefore, when non-numerical data is generated during the calculation, an influence of the generated non-numerical data is propagated to a subsequent calculation.

SUMMARY

The present disclosure provides an electronic control device provided with a plurality of calculation blocks that calculate floating-point data. The electronic control device includes a storage that stores calculation data items of the plurality of calculation blocks. The electronic control device calculates a command value of a control amount for a control target based on the calculation data items of the plurality of calculation blocks.

BRIEF DESCRIPTION OF DRAWINGS

The features and advantages of the present disclosure will become more apparent from the following detailed description made with reference to the accompanying drawings.

DETAILED DESCRIPTION

Figure 1:
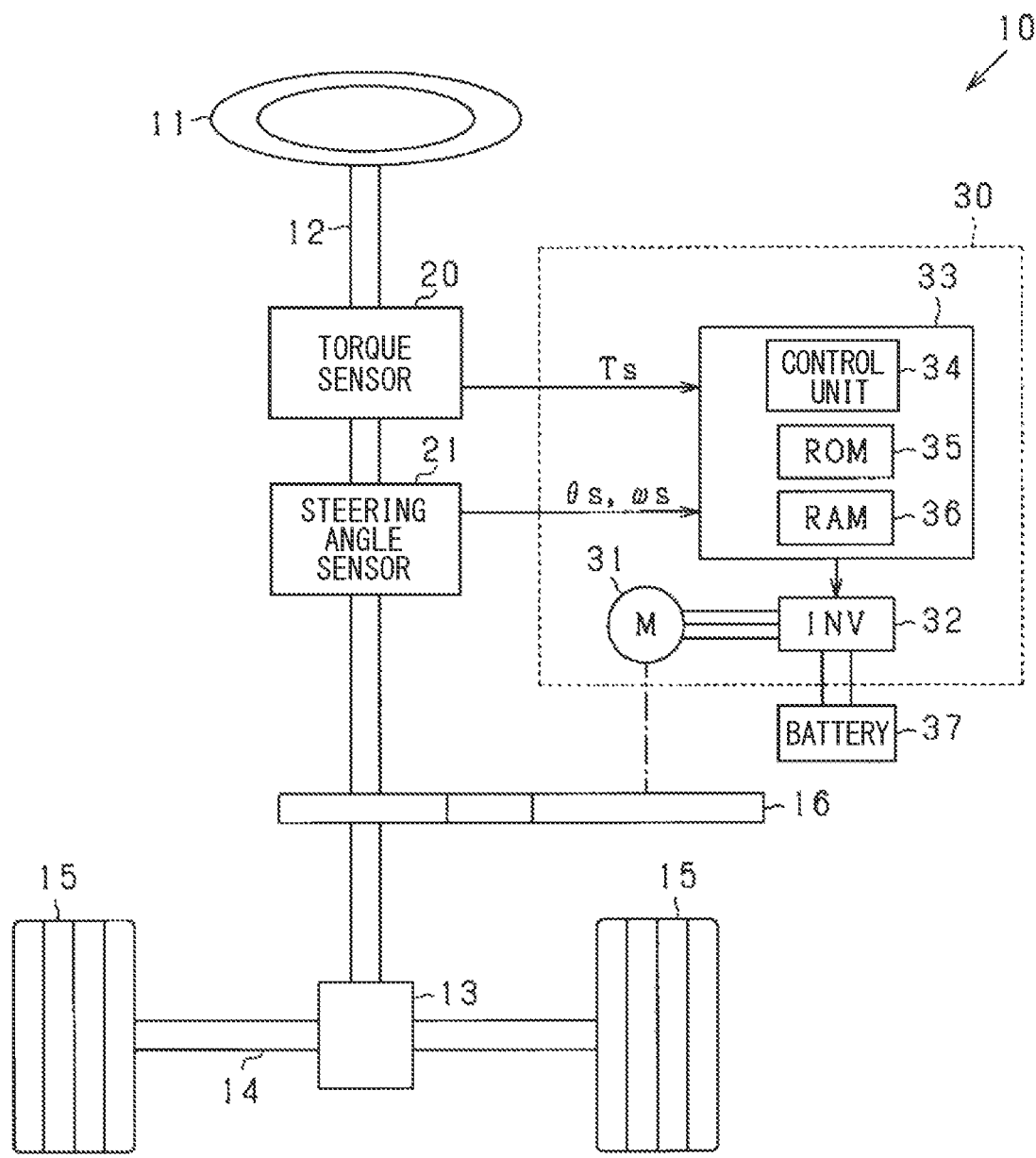
FIG. 1 is a configuration diagram of a steering system according to a first embodiment.

For example, as an exemplary electronic control device that calculates floating-point data, a default value instead of previous calculation data is used when the exemplary electronic control device performs a current calculation using the previous calculation data and the previous calculation data is non-numerical.

As another exemplary electronic control device, a device including multiple calculation blocks that calculate floating-point data, and a storage that stores calculation data of the multiple calculation blocks is known. The electronic control device calculates a command value of a control amount of a control target based on the calculation data of the multiple calculation blocks, and controls the control amount of the control target using the command value.

This electronic control device is also required to deal with a difficulty of the non-numerical calculation data. The electronic control device is required to deal with not only the difficulty of the non-numerical calculation data but also a difficulty of infinite calculation data.

The present disclosure provides an electronic control device capable of enhancing a reliability of control of a control amount of a control target.

An exemplary embodiment of the present disclosure provides an electronic control device provided with a plurality of calculation blocks that calculate floating-point data. The electronic control device includes a storage, a command value calculation unit, a determination unit, and a processing unit. The storage is configured to store calculation data items of the plurality of calculation blocks. The command value calculation unit is configured to calculate a command value of a control amount in a control target based on the calculation data items of the plurality of calculation blocks. The determination unit id configured to execute a determination process of determining whether a calculation data item of at least one of the plurality of calculation blocks among the calculation data items stored in the storage is non-numerical or infinite before the command value calculation unit calculates the command value. The processing unit is configured to execute an initialization process on the calculation data item determined as being non-numerical or infinite among the calculation data items stored in the storage before the command value calculation unit calculates the command value.

In the exemplary embodiment of the present disclosure, before the command value is calculated by the command value calculation unit, a determination is made as to whether the calculation data item of at least one calculation block among the calculation data items stored in the storage is non-numerical or infinite. When the calculation data item is determined to be non-numerical or infinite, an initialization process is executed on the calculation data item of the calculation block subjected to the determination among the calculation data items stored in the storage. Therefore, an influence of the non-numerical or infinite calculation data item on the calculation of the command value can be reduced. Accordingly, a reliability of control of a control amount of a control target can be enhanced.

First Embodiment

Hereinafter, a first embodiment embodying an electronic control device according to the present disclosure will be described with reference to the drawings. The electronic control device according to the present embodiment is included in a steering system that assists a driver in steering.

As shown in FIG. 1, a steering system 10 includes a steering wheel 11, a steering shaft 12, a pinion gear 13, a rack shaft 14, and wheels 15. The steering shaft 12 is provided with the steering wheel 11 at one end and the pinion gear 13 at the other end. The pinion gear 13 meshes with the rack shaft 14. A pair of wheels 15 are connected to respective two ends of the rack shaft 14 via a die rod or the like. A rotational movement of the steering shaft 12 accompanying an operation of the driver to the steering wheel 11 is converted into a linear movement of the rack shaft 14. Accordingly, a steering angle of the wheels 15 is changed.

The steering system 10 includes a torque sensor 20 and a steering angle sensor 21 that are provided on the steering shaft 12. The torque sensor 20 detects a steering torque Ts accompanying the operation of the driver to the steering wheel 11. The steering angle sensor 21 detects a steering angle θs of the steering wheel 11 by the driver and a steering angular velocity ωs that is a change speed of the steering angle θs.

The steering system 10 includes an electric power steering device (hereinafter referred to as an EPS device 30) and a reduction gear 16. The EPS device 30 includes a motor 31 and an inverter 32. According to the present embodiment, the motor 31 and the inverter 32 are three-phase. A rotation shaft of a rotor included in the motor 31 is connected to the steering shaft 12 via the reduction gear 16. Electric power is supplied to a stator winding included in the motor 31 from a battery 37 provided in the steering system 10 via the inverter 32. Accordingly, the motor 31 generates a torque in the steering shaft 12 to assist the driver in steering.

The EPS device 30 includes an electronic control device 33. In addition to detection values of the torque sensor 20 and the steering angle sensor 21, a detection value of a vehicle speed sensor 22 provided in a vehicle is input to the electronic control device 33 (see FIG. 2).

The electronic control device 33 includes a control unit 34 mainly including a CPU, a ROM 35, and a RAM 36 that is a storage or a storage. The control unit 34 performs steering control to control an output torque of the motor 31 to a steering command torque Ttgt by calculating floating-point data in accordance with an instruction of a control program stored in the ROM 35.

A format of the floating-point data is defined by the IEEE754 standard. Among the data in the format, the floating-point data in a single-precision storage format is defined by a 1-bit sign part, an 8-bit exponent part, and a 23-bit mantissa part in order from the most significant bit. In addition, the floating-point data in a double-precision storage format is defined by a 1-bit sign part, an 11-bit exponent part, and a 52-bit mantissa part in order from the most significant bit.

The RAM 36 is a storage device (for example, a volatile memory) that stores data such as variables used while the control unit 34 is executing the control program.

Figure 2:
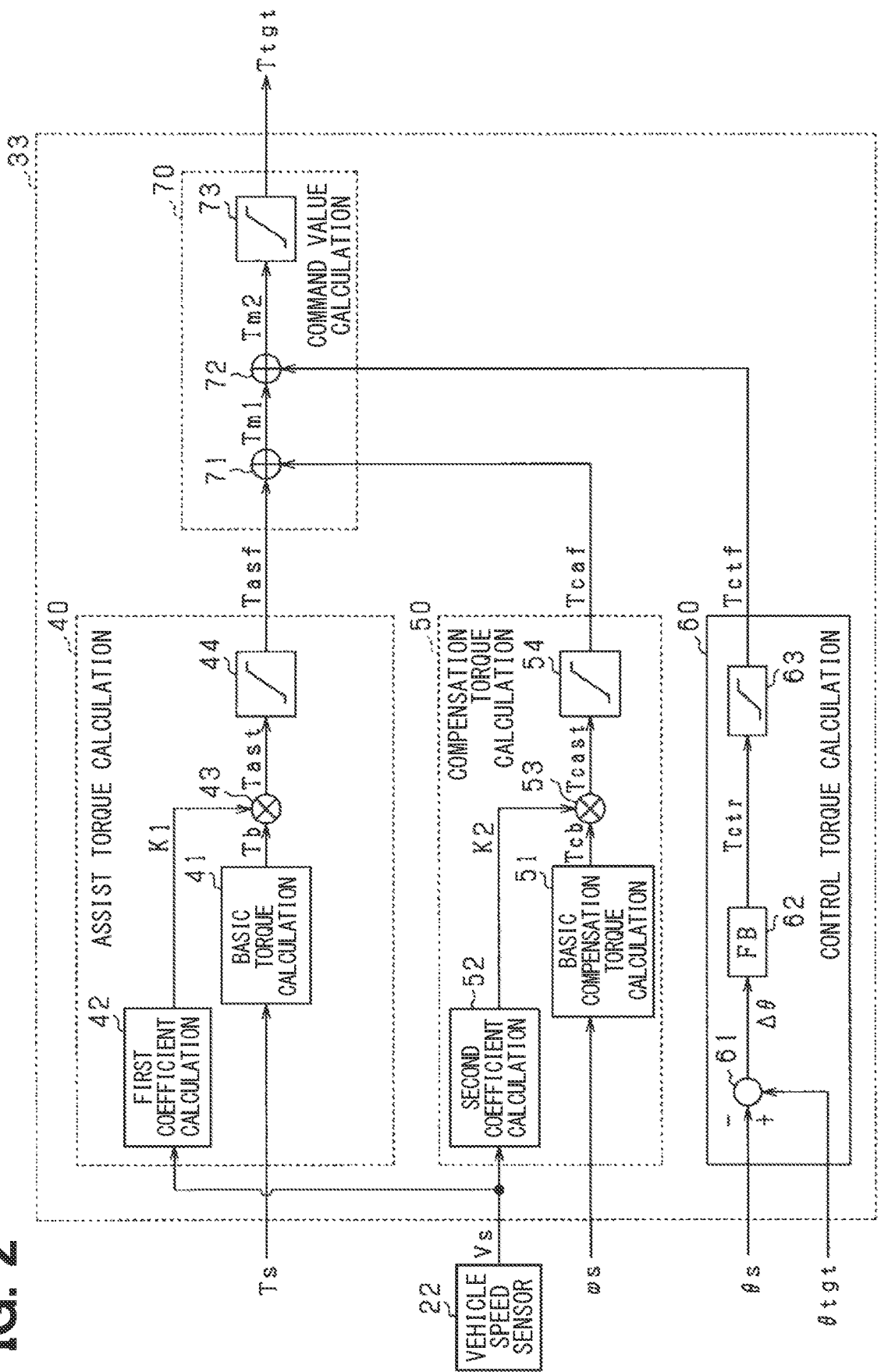
FIG. 2 is a block diagram showing a process of an electronic control device.

FIG. 2 shows a block diagram of a calculation process of the steering command torque Ttgt (corresponding to a "command value") in the steering control executed by the control unit 34.

The control unit 34 includes an assist torque calculation unit 40, a compensation torque calculation unit 50, a control torque calculation unit 60, and a command value calculation unit 70. According to the present embodiment, each of the assist torque calculation unit 40, the compensation torque calculation unit 50, and the control torque calculation unit 60 corresponds to a "partial command value calculation unit", and the command value calculation unit 70 corresponds to a "command value calculation unit".

First, the assist torque calculation unit 40 will be described. The assist torque calculation unit 40 calculates an assist torque Tasf based on the steering torque Ts detected by the torque sensor 20 and a traveling speed Vs of a subject vehicle detected by the vehicle speed sensor 22. The assist torque calculation unit 40 includes a group of a basic torque calculation unit 41, a first coefficient calculation unit 42, a first multiplication unit 43, and a first limiter 44 among multiple calculation blocks provided in the control unit 34.

The basic torque calculation unit 41 calculates a basic torque Tb based on the detected steering torque Ts. Specifically, the basic torque calculation unit 41 increases the basic torque Tb as the steering torque Ts increases. The basic torque Tb may be calculated based on map information or mathematical formula information in which the basic torque Tb is defined in association with the steering torque Ts.

The first coefficient calculation unit 42 calculates a first coefficient K1 (>0) based on the detected traveling speed Vs. The first coefficient K1 is calculated such that the lower the traveling speed Vs, the larger the basic torque Tb. This is because the lower the traveling speed Vs, the larger a torque required for assisting the driver in the steering. For example, the first coefficient calculation unit 42 reduces the first coefficient K1 as the traveling speed Vs increases. The first coefficient K1 may be calculated based on map information or mathematical formula information in which the first coefficient K1 is defined in association with the traveling speed Vs.

The first multiplication unit 43 calculates a basic assist torque Tast by multiplying the basic torque Tb by the first coefficient K1.

When the calculated basic assist torque Tast is equal to or larger than a lower limit guard value and equal to or less than an upper limit guard value, the first limiter 44 outputs the basic assist torque Tast calculated by the first multiplication unit 43 as the assist torque Tasf (corresponding to a "partial command value"). On the other hand, the first limiter 44 outputs the lower limit guard value as the assist torque Tasf when the calculated basic assist torque Tast is lower than the lower limit guard value, and outputs the upper limit guard value as the assist torque Tasf when the calculated basic assist torque Tast is larger than the upper limit guard value.

Subsequently, the compensation torque calculation unit 50 will be described. The compensation torque calculation unit 50 calculates a compensation torque Tcaf based on the traveling speed Vs and the steering angular velocity ωs detected by the steering angle sensor 21. The compensation torque calculation unit 50 includes a group of a basic compensation torque calculation unit 51, a second coefficient calculation unit 52, a second multiplication unit 53, and a second limiter 54 among the multiple calculation blocks provided in the control unit 34.

The basic compensation torque calculation unit 51 calculates a basic compensation torque Tcb based on the detected steering angular velocity ωs. The base compensation torque Tcb may be calculated based on map information or mathematical formula information in which the basic compensation torque Tcb is defined in association with the steering angular velocity ωs.

The second coefficient calculation unit 52 calculates a second coefficient K2 (>0) based on the traveling speed Vs. Similar to the first coefficient K1, the second coefficient K2 is calculated such that the lower the traveling speed Vs, the larger the basic compensation torque Tcb. For example, the second coefficient calculation unit 52 reduces the second coefficient K2 as the traveling speed Vs increases. The second coefficient K2 may be calculated based on map information or mathematical formula information in which the second coefficient K2 is defined in association with the traveling speed Vs.

The second multiplication unit 53 calculates a basic compensation torque Tcast by multiplying the basic compensation torque Tcb by the second coefficient K2.

When the calculated basic compensation torque Tcast is equal to or larger than a lower limit guard value and equal to or less than an upper limit guard value, the second limiter 54 outputs the basic compensation torque Tcast calculated by the second multiplication unit 53 as a compensation torque Tcaf (corresponding to a "partial command value"). On the other hand, the second limiter 54 outputs the lower limit guard value as the compensation torque Tcaf when the calculated basic compensation torque Tcast is lower than the lower limit guard value, and outputs the upper limit guard value as the compensation torque Tcaf when the calculated basic compensation torque Tcast is larger than the upper limit guard value.

There are various other compensation torques used to calculate the steering command torque Ttgt, and according to the present embodiment, the compensation torque Tcaf calculated by the compensation torque calculation unit 50 is shown as an example.

Subsequently, the control torque calculation unit 60 will be described. The control torque calculation unit 60 calculates a control torque Tctf based on the steering angle θs detected by the steering angle sensor 21 and a target steering angle θtgt. According to the present embodiment, the target steering angle θtgt is a value set for driving support control of the subject vehicle, and is input to the electronic control device 33 from a host control unit. Examples of the driving support control include lane keep assist for the subject vehicle to travel without deviating from a traveling lane, adaptive cruise control for the subject vehicle to follow a preceding vehicle, and parking support control that supports the subject vehicle in parking. When the driver does not operate the steering wheel 11 during the driving support control, for example, the assist torque Tasf and the compensation torque Tcaf are 0.

The control torque calculation unit 60 includes a group of a deviation calculation unit 61, a feedback control unit 62, and a third limiter 63 among the multiple calculation blocks provided in the control unit 34. The deviation calculation unit 61 calculates a steering deviation Δθ by subtracting the steering angle θs from the target steering angle θtgt.

The feedback control unit 62 calculates a basic control torque Tctr as an operation amount for feedback-controlling the steering deviation Δθ to 0. As the feedback control, for example, proportional integral control or proportional integral differential control can be used.

When the calculated basic control torque Tctr is equal to or larger than a lower limit guard value and equal to or less than an upper limit guard value, the third limiter 63 outputs the basic control torque Tctr calculated by the feedback control unit 62 as the control torque Tctf (corresponding to a "partial command value"). On the other hand, the third limiter 63 outputs the lower limit guard value as the control torque Tctf when the calculated basic control torque Tctr is lower than the lower limit guard value, and outputs the upper limit guard value as the control torque Tctf when the calculated basic control torque Tctr is larger than the upper limit guard value.

Subsequently, the command value calculation unit 70 will be described. The assist torque calculation unit 71 calculates a first command torque Tm1 by adding the compensation torque Tcaf output from the second limiter 54 to the assist torque Tasf output from the first limiter 44.

A control torque addition unit 72 calculates a second command torque Tm2 by adding the control torque Tctf output from the third limiter 63 to the first command torque Tm1.

When the calculated second command torque Tm2 is equal to or larger than a lower limit guard value and equal to or less than an upper limit guard value, the fourth limiter 73 outputs the second command torque Tm2 calculated by the control torque addition unit 72 as the steering command torque Ttgt. On the other hand, the fourth limiter 73 outputs the lower limit guard value as the steering command torque Ttgt when the calculated second command torque Tm2 is lower than the lower limit guard value, and outputs the upper limit guard value as the steering command torque Ttgt when the calculated second command torque Tm2 is larger than the upper limit guard value.

The control unit 34 performs switching control of the inverter 32 in order to control the output torque of the motor 31 (corresponding to the "control amount of a control target") to the calculated steering command torque Ttgt. When the calculation data ((corresponding to a "calculation data item")) used for calculating the steering command torque Ttgt includes non-numerical data or infinite data, a reliability of the steering control may decrease. For example, when the calculation data is +∞ or −∞, a value calculated by a limiter is an upper limit guard value or a lower limit guard value, and the steering command torque Ttgt may deviate significantly from a normal value. Therefore, according to the present embodiment, the control unit 34 executes a process shown in FIG. 3. The process is repeatedly executed in a predetermined control cycle.

In step S10, the assist torque calculation unit 40 calculates the assist torque Tasf.

In step S20, a first check process is executed. The first check process will be described with reference to FIG. 4. In step S21, first addition data DA1 is calculated by adding the basic torque Tb calculated by the basic torque calculation unit 41, the first coefficient K1 calculated by the first coefficient calculation unit 42, the basic assist torque Tast calculated by the first multiplication unit 43, and the assist torque Tasf calculated by the first limiter 44.

In step S22, first determination data DB1 is calculated by subtracting the first addition data DA1 calculated in step S21 from the first addition data DA1 calculated in step S21. The first determination data DB1 is calculated in order to quickly determine whether at least one of the non-numerical data and the infinite data (+∞, −∞) is included in each calculation data (the basic torque Tb, the first coefficient K1, the basic assist torque Tast, and the assist torque Tasf) in the assist torque calculation unit 40.

That is, when at least one of the calculation data is non-numerical, addition data of the calculation data is also non-numerical, and when at least one of the calculation data is infinite, data obtained by subtracting the addition data from the addition data of the calculation data is non-numerical. In view of this point, the first determination data DB1 is calculated. When at least one of the calculation data used for calculating the first determination data DB1 is non-numerical, the first addition data DA1 is also non-numerical, and the first determination data DB1 calculated based on the first addition data DA1 is also non-numerical. In addition, when at least one of the calculation data used for calculating the first determination data DB1 is infinite, the first determination data DB1 calculated based on the first addition data DA1 is non-numerical.

In step S23, a determination is made as to whether the first determination data DB1 calculated in step S22 is non-numerical. When the first determination data DB1 is determined to be not non-numerical in step S23, the process proceeds to step S30 in FIG. 3.

On the other hand, when the first determination data DB1 is determined to be non-numerical in step S23, the process proceeds to step S24. In step S24, whether the first determination data DB1 is determined to be non-numerical in step S23 in N (N≥2) consecutive control cycles is determined.

When a negative determination is made in step S24, the process proceeds to step S25 to execute a fail-safe process. According to the present embodiment, as the fail-safe process, an initialization process is executed in which the basic torque Tb calculated by the basic torque calculation unit 41, the first coefficient K1 calculated by the first coefficient calculation unit 42, the basic assist torque Tast calculated by the first multiplication unit 43, and the assist torque Tasf calculated by the first limiter 44 among data stored in the RAM 36 are rewritten to default values (initial values). Accordingly, when there is no abnormality in which the calculation data is permanently non-numerical or infinite, the steering command torque Ttgt can be brought close to a normal value after a next control cycle.

On the other hand, when an affirmative determination is made in step S24, the process proceeds to step S26, and a value of a flag F is set to 1. The flag F indicates the permanent abnormality by 1 and no permanent abnormality by 0. An initial value of the flag F is set to 0.

Figure 3:
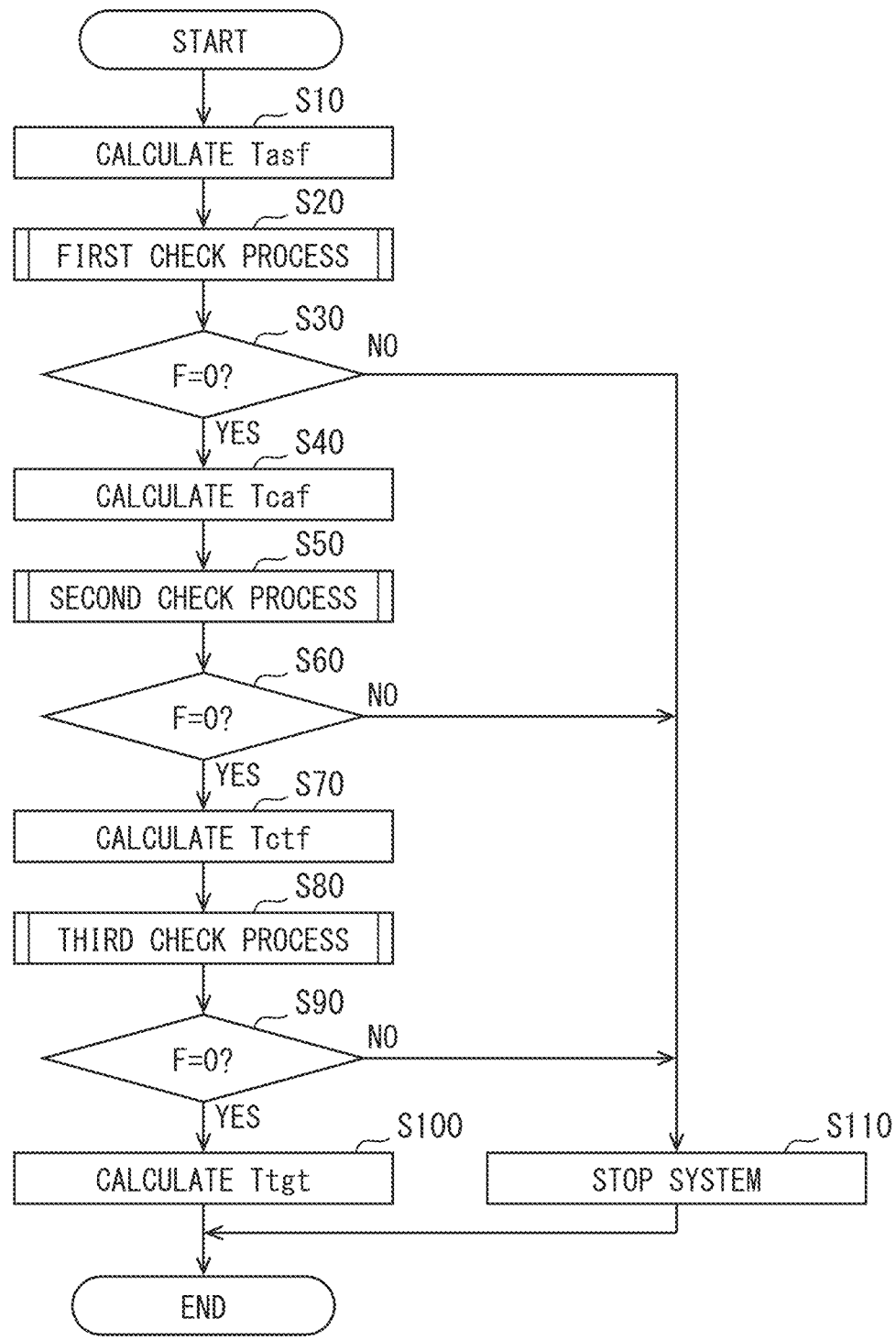
FIG. 3 is a flowchart showing a procedure of a calculation process of a steering command torque.

After the process of step S25 or S26 is completed, the process proceeds to step S30 in FIG. 3, and a determination is made as to whether the value of the flag F is 0. When the value of the flag F is determined to be 0 in step S30, the process proceeds to step S40, and the compensation torque calculation unit 50 calculates the compensation torque Tcaf.

Figure 5:
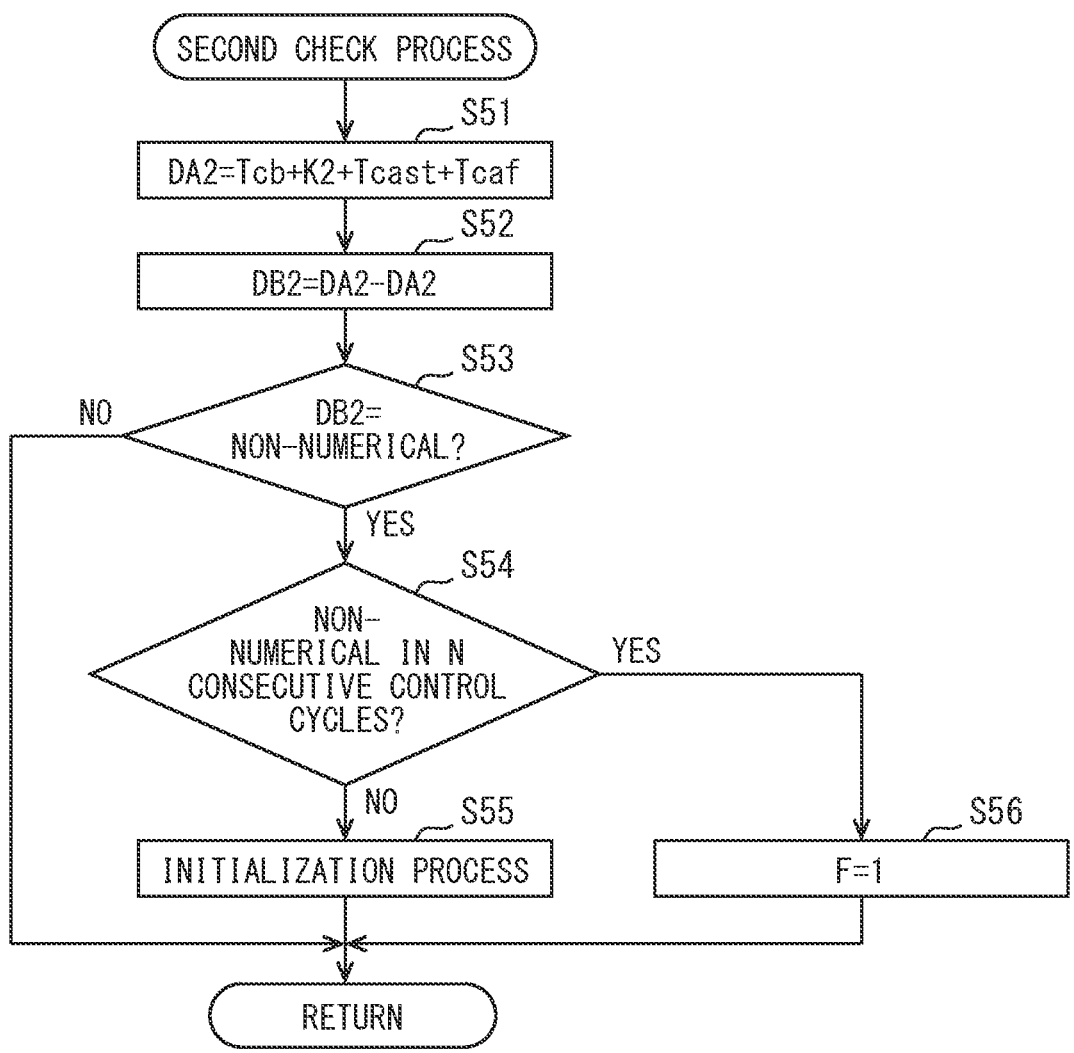
FIG. 5 is a flowchart showing a procedure of a second check process.

In step S50, a second check process is executed. The second check process will be described with reference to FIG. 5. In step S51, second addition data DA2 is calculated by adding the basic compensation torque Tcb calculated by the basic compensation torque calculation unit 51, the second coefficient K2 calculated by the second coefficient calculation unit 52, the basic compensation torque Tcast calculated by the second multiplication unit 53, and the compensation torque Tcaf calculated by the second limiter 54.

In step S52, second determination data DB2 is calculated by subtracting the second addition data DA2 calculated in step S51 from the second addition data DA2 calculated in step S51.

In step S53, a determination is made as to whether the second determination data DB2 calculated in step S52 is non-numerical. When the second determination data DB2 is determined to be not non-numerical in step S53, the process proceeds to step S60 in FIG. 3.

On the other hand, when the second determination data DB2 is determined to be non-numerical in step S53, the process proceeds to step S54. In step S54, whether the second determination data DB2 is determined to be non-numerical in step S53 in the N (N≥2) consecutive control cycles is determined.

When a negative determination is made in step S54, the process proceeds to step S55 to execute a fail-safe process. According to the present embodiment, as the fail-safe process, an initialization process is executed in which the basic compensation torque Tcb calculated by the basic compensation torque calculation unit 51, the second coefficient K2 calculated by the second coefficient calculation unit 52, the basic compensation torque Tcast calculated by the second multiplication unit 53, and the compensation torque Tcaf calculated by the second limiter 54 among the data stored in the RAM 36 are rewritten to default values.

On the other hand, when an affirmative determination is made in step S54, the process proceeds to step S56 and the value of the flag F is set to 1.

After the process of step S55 or S56 is completed, the process proceeds to step S60 in FIG. 3, and a determination is made as to whether the value of the flag F is 0. When the value of the flag F is determined to be 0 in step S60, the process proceeds to step S70, and the control torque calculation unit 60 calculates the control torque Tctf.

Figure 6:
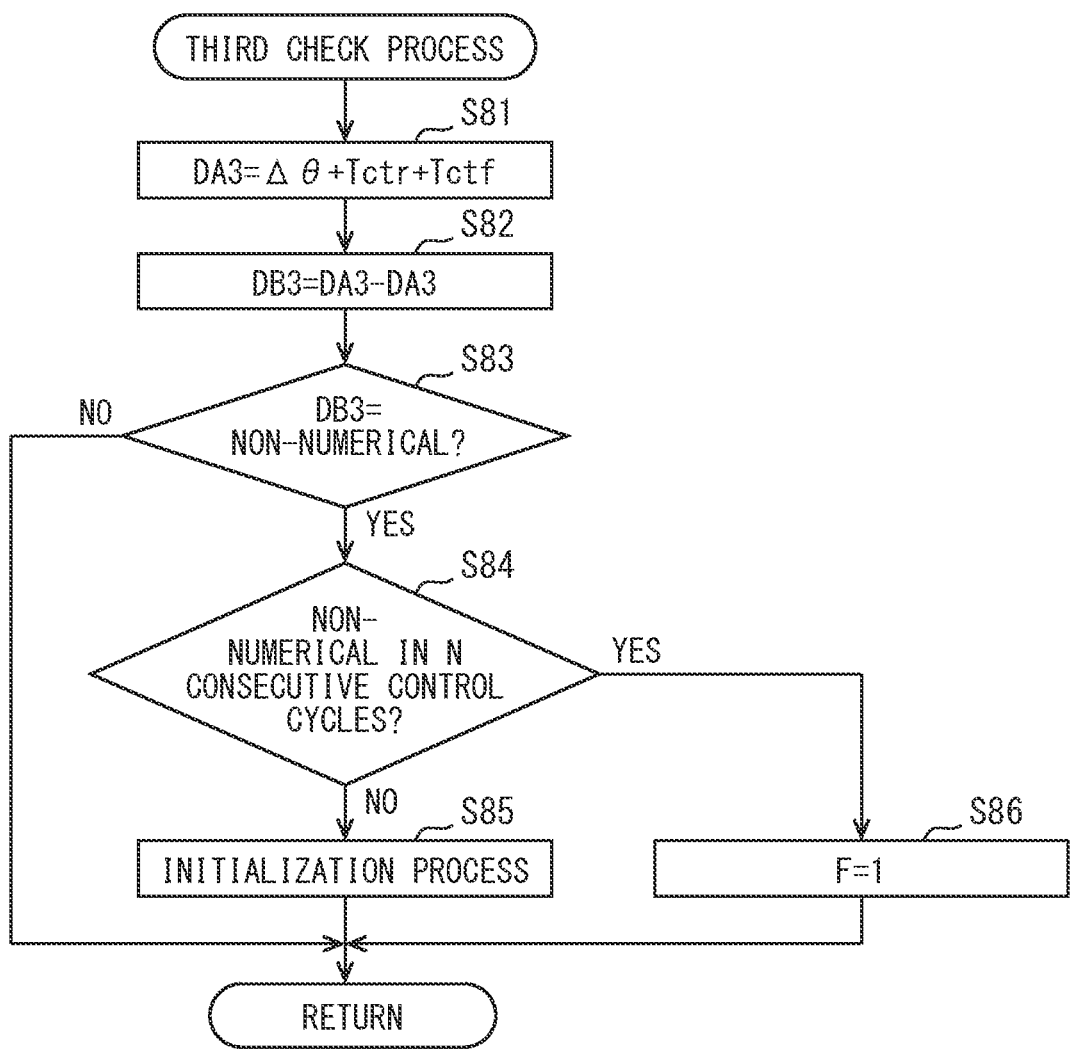
FIG. 6 is a flowchart showing a procedure of a third check process.

In step S80, a third check process is executed. The third check process will be described with reference to FIG. 6. In step S81, third addition data DA3 is calculated by adding the steering deviation Δθ calculated by the deviation calculation unit 61, the basic control torque Tctr calculated by the feedback control unit 62, and the control torque Tctf calculated by the third limiter 63.

In step S82, third determination data DB3 is calculated by subtracting the third addition data DA3 calculated in step S81 from the third addition data DA3 calculated in step S81.

In step S83, a determination is made as to whether the third determination data DB3 calculated in step S82 is non-numerical.

When the third determination data DB3 is determined to be not non-numerical in step S83, the process proceeds to step S90 in FIG. 3.

On the other hand, when the third determination data DB3 is determined to be non-numerical in step S83, the process proceeds to step S84. In step S84, whether the third determination data DB3 is determined to be non-numerical in step S83 in the N (N≥2) consecutive control cycles is determined.

When a negative determination is made in step S84, the process proceeds to step S85 to execute a fail-safe process. According to the present embodiment, as the fail-safe process, an initialization process is executed in which the steering deviation Δθ calculated by the deviation calculation unit 61, the basic control torque Tctr calculated by the feedback control unit 62, and the control torque Tctf calculated by the third limiter 63 among the data stored in the RAM 36 are rewritten to default values.

When an affirmative determination is made in step S84, the process proceeds to step S86, and the value of the flag F is set to 1.

After the process of step S85 or S86 is completed, the process proceeds to step S90 in FIG. 3, and a determination is made as to whether the value of the flag F is 0. When the value of the flag F is determined to be 0 in step S90, the process proceeds to step S100, and the command value calculation unit 70 calculates the steering command torque Ttgt.

On the other hand, when the value of the flag F is determined to be 1 in step S30, S60 or S90, the process proceeds to step S110 and steering control in the steering system 10 is stopped. Accordingly, the assist in steering of the driver is not executed.

According to the present embodiment, the processes of steps S21, S22, S51, S52, S81, and S82 correspond to a "determination value calculation unit", and the processes of steps S23, S53, and S83 correspond to a "determination unit". In addition, the processes of steps S24 to S26, S54 to S56, S84 to S86, and S110 correspond to a "processing unit".

Alternatively, when the value of the flag F is determined to be 1 in step S30, the assist torque Tasf used for calculating the steering command torque Ttgt may be set to 0, and the process may proceed to step S40. Further, when the value of the flag F is determined to be 1 in step S60, the compensation torque Tcaf used for calculating the steering command torque Ttgt may be set to 0, and the process may proceed to step S70. In addition, when the value of the flag F is determined to be 1 in step S90, the compensation torque Tcaf used for calculating the steering command torque Ttgt may be set to 0, and the process may proceed to step S100.

According to the present embodiment described in detail above, the following effects can be obtained.

Before the steering command torque Ttgt is calculated, the first addition data DA1 is calculated based on each calculation data (the basic torque Tb, the first coefficient K1, the basic assist torque Tast, and the assist torque Tasf) of the assist torque calculation unit 40 in the current control cycle among the data stored in the RAM 36. The first determination data DB1 is calculated by subtracting the calculated first addition data DA1 from the calculated first addition data DA1. When the calculated first determination data DB1 is determined to be non-numerical, in the current control cycle, an initialization process is executed in which the calculation data of the assist torque calculation unit 40 is rewritten to a default value. Accordingly, the calculation data of the assist torque calculation unit 40 can be quickly determined to include at least one of non-numerical data and infinite data. In addition, in each of the compensation torque calculation unit 50 and the control torque calculation unit 60, the calculation data can be quickly determined to include at least one of the non-numerical data and the infinite data.

According to the above present embodiment, the calculation data can be quickly determined to include at least one of the non-numerical data and the infinite data, and the steering command torque Ttgt can be prevented from being an unacceptable value as a steering torque. Accordingly, a reliability of steering control of the EPS device 30 can be suitably enhanced.

Determination data is calculated for each of the assist torque calculation unit 40, the compensation torque calculation unit 50, and the control torque calculation unit 60, and a determination is made as to whether the calculated determination data is non-numerical. Among the assist torque calculation unit 40, the compensation torque calculation unit 50, and the control torque calculation unit 60, an initialization process is executed for the calculation data of only a calculation unit for which the determination data is determined to be non-numerical. Accordingly, a torque that can be calculated using detection values of the steering torque Ts, the steering angle θs, and the like among the assist torque Tasf, the compensation torque Tcaf, and the control torque Tctf can be reflected in the steering command torque Ttgt as much as possible. As a result, a decrease in a calculation accuracy of the steering command torque Ttgt can be limited.

When the determination data is not determined to be continuously non-numerical in the N control cycles, the initialization process is executed, and when the determination data is determined to be continuously non-numerical in the N control cycles, the steering control is stopped. Accordingly, the steering control can be continued when an abnormality in which the calculation data is temporarily non-numerical or infinite occurs, and the steering system 10 can be stopped when an abnormality in which the calculation data is permanently non-numerical or infinite occurs.

Second Embodiment

Hereinafter, a second embodiment will be described with reference to the drawings, focusing on differences from the first embodiment. According to the present embodiment, a method for checking non-numerical data included in calculation data is changed.

Figure 7:
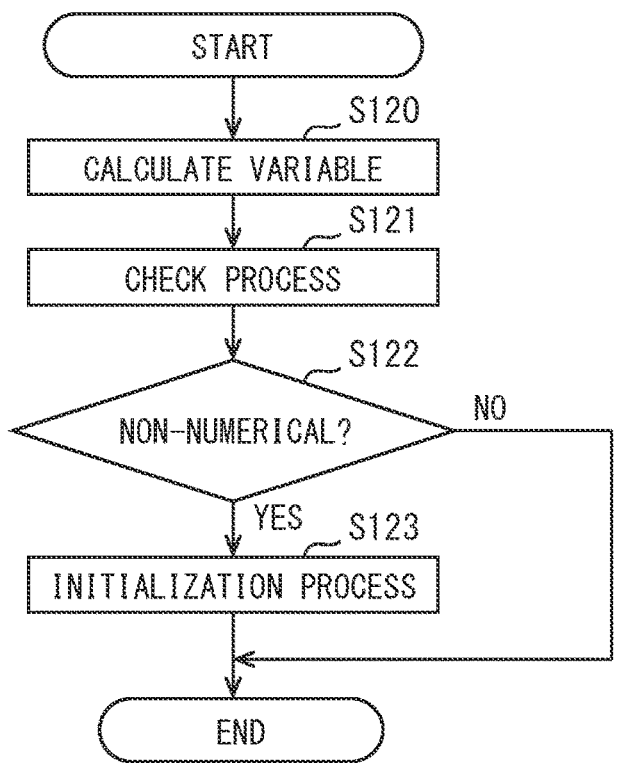
FIG. 7 is a flowchart showing a procedure of a check process according to a second embodiment.

FIG. 7 shows a procedure of a check process according to the present embodiment. The process is executed by the control unit 34.

First, the check process of each calculation data of the assist torque calculation unit 40 will be described.

In step S120, the basic torque calculation unit 41 calculates the basic torque Tb. In the following step S121, a determination is made as to whether the calculated basic torque Tb is non-numerical. As a method for determining whether the basic torque Tb is non-numerical, for example, the following methods can be used. A first method is a method for determining whether the basic torque Tb is non-numerical by a function of detecting whether a comparison result is unordered among calculation functions of floating-point data. A second method is a method for comparing calculation data D calculated in step S120 and determining that the basic torque Tb is non-numerical when a comparison result is False. A third method is a method for determining that the basic torque Tb is non-numerical when a comparison result of "D! =D" is True.

In the following step S122, a determination is made as to whether the determination result in step S121 is non-numerical. When the determination result is determined to be non-numerical in step S122, the process proceeds to step S123, and as a fail-safe process, an initialization process is executed in which the basic torque Tb among the data stored in the RAM 36 is rewritten to a default value.

When the process of step S123 is completed, or when the determination result is determined to be not non-numerical in step S122, the first coefficient K1 calculated by the first coefficient calculation unit 42, which is next calculation data, is subjected to a series of processes shown in FIG. 7. Thereafter, the basic assist torque Tast and the assist torque Tasf are also sequentially subjected to the series of processes shown in FIG. 7. Accordingly, it is possible to check whether each of the basic torque Tb, the first coefficient K1, the basic assist torque Tast, and the assist torque Tasf is non-numerical in the current control cycle. Incidentally, according to the present embodiment, for example, the basic torque calculation unit 41 that calculates the basic torque Tb corresponds to a "preceding calculation block", and the first coefficient calculation unit 42 that calculates the first coefficient K1 corresponds to a "subsequent calculation block".

After the checking on the assist torque calculation unit 40, each of the compensation torque calculation unit 50 and the control torque calculation unit 60 is sequentially subjected to the series of processes shown in FIG. 7. Accordingly, it is possible to check whether each calculation data in the assist torque calculation unit 40, the compensation torque calculation unit 50, and the control torque calculation unit 60 is non-numerical in the current control cycle.

According to the above present embodiment, even when calculation data of the preceding calculation block is non-numerical, an influence of non-numerical data can be prevented from spreading to calculation data of the subsequent calculation block. Accordingly, a reliability of steering control can be enhanced.

Incidentally, according to the present embodiment, for example, when the basic torque Tb is determined to be non-numerical in each of N consecutive control cycles, the steering control may be stopped.

Third Embodiment

Hereinafter, a third embodiment will be described with reference to the drawings, focusing on differences from the second embodiment. According to the present embodiment, a determination is made as to whether abnormal data included in calculation data is infinite, instead of determining whether abnormal data included in the calculation data is non-numerical.

Figure 8:
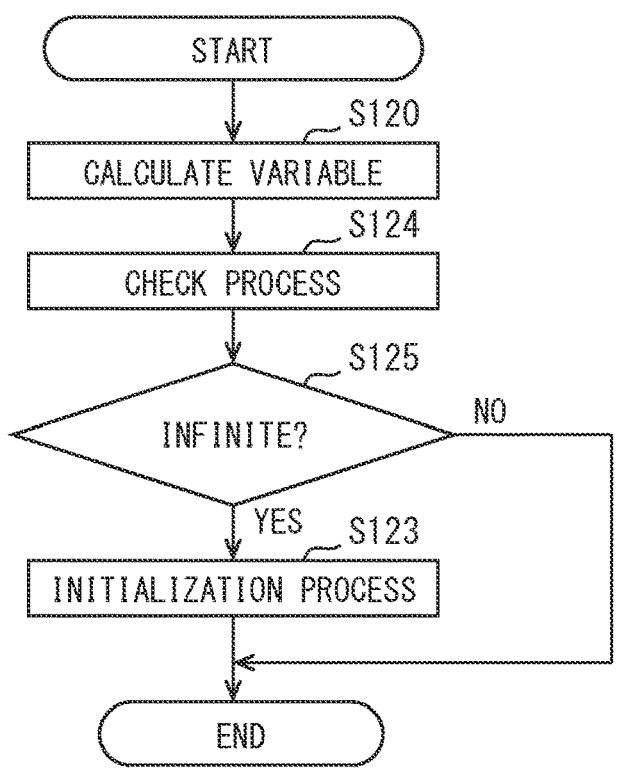
FIG. 8 is a flowchart showing a procedure of a check process according to a third embodiment.

FIG. 8 shows a procedure of a check process according to the present embodiment. The process is executed by the control unit 34. In FIG. 8, the same process as that shown in FIG. 7 is designated by the same reference numeral for convenience. In addition, in the following description, the basic torque calculation unit 41 of the assist torque calculation unit 40 will be described as an example.

In step S124, a determination is made as to whether the calculated basic torque Tb is infinite (+∞, −∞). For example, when floating-point data is data in a single-precision storage format, the basic torque Tb may be determined to be infinite when an exponent part is "255" and a mantissa part is "0".

In the following step S125, a determination is made as to whether the determination result in step S124 is infinite. When the determination result is determined to be infinite in step S125, the process proceeds to step S123. Incidentally, according to the present embodiment, for example, when the basic torque Tb is determined to be infinite in each of N consecutive control cycles, steering control may be stopped.

According to the above present embodiment, the same effect as that of the second embodiment can be obtained.

Fourth Embodiment

Figure 9:
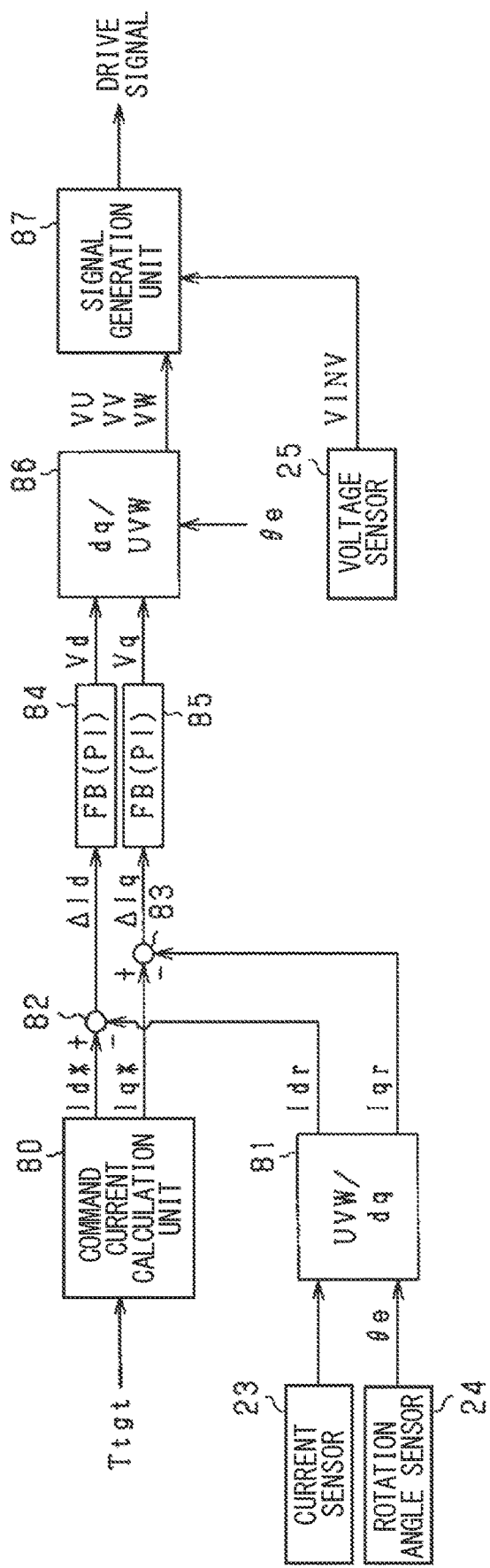
FIG. 9 is a block diagram showing a torque control process according to a fourth embodiment.

Hereinafter, a fourth embodiment will be described with reference to the drawings, focusing on differences from the first embodiment. The control unit 34 performs switching control of the inverter 32 in order to control an output torque of the motor 31 to the calculated steering command torque Ttgt. A block diagram of the switching control is shown in FIG. 9. According to the present embodiment, in a process shown in FIG. 9, it is checked whether calculation data includes non-numerical data or infinite data. According to the present embodiment, the process shown in FIG. 9 executed by the control unit 34 corresponds to a "drive calculation unit".

The process shown in FIG. 9 includes multiple calculation blocks. Calculation data of each calculation block is stored in the RAM 36. A command current calculation unit 80 calculates d-axis and q-axis command currents Id* and Iq* based on the steering command torque Ttgt calculated by the command value calculation unit 70. Calculation data to be described below, such as the calculated command currents Id* and Iq*, is stored in the RAM 36.

A two-phase conversion unit 81 converts U-phase, V-phase, and W-phase currents in a three-phase fixed coordinate system into a d-axis current Idr and a q-axis current Iqr in a two-phase rotating coordinate system (d-q coordinate system) based on a detection value of a current sensor 23 and an electrical angle θe of the motor 31 detected by a rotation angle sensor 24. The current sensor 23 detects the currents of at least two phases among the U-phase, V-phase, and W-phase currents. The rotation angle sensor 24 is, for example, a resolver or a hall element.

A d-axis deviation calculation unit 82 calculates a d-axis current deviation ΔId by subtracting the d-axis current Idr from the d-axis command current Id*. A q-axis deviation calculation unit 83 calculates a q-axis current deviation ΔIq by subtracting the q-axis current Iqr from the q-axis command current Iq*.

A d-axis command voltage calculation unit 84 calculates a d-axis command voltage Vd as an operation amount for feedback-controlling the d-axis current Idr to the d-axis command current Id* based on the d-axis current deviation ΔId. A q-axis command voltage calculation unit 85 calculates a q-axis command voltage Vq as an operation amount for feedback-controlling the q-axis current Iqr to the q-axis command current Iq* based on the q-axis current deviation ΔIq. The feedback control used in the d-axis command voltage calculation unit 84 and the q-axis command voltage calculation unit 85 may be, for example, proportional integral control.

A three-phase conversion unit 86 converts the d-axis and q-axis command voltages Vd and Vq in the d-q coordinate system into U-phase, V-phase, and W-phase command voltages VU, VV, and VW in the three-phase fixed coordinate system based on the d-axis and q-axis command voltages Vd and Vq, and the electrical angle θe. According to the present embodiment, the U-phase, V-phase, and W-phase command voltages VU, VV, and VW have waveforms whose phases are shifted by 120° with respect to an electric angle.

A signal generation unit 87 generates drive signals of upper and lower arm switches in U, V, and W phases included in the inverter 32 based on the U-phase, V-phase, and W-phase command voltages VU, VV, and VW, and an input voltage (hereinafter, referred to as a power supply voltage VINV) of the inverter 32 detected by a voltage sensor 25. The signal generation unit 87 generates a drive signal by a PWM process based on, for example, a magnitude comparison between a value obtained by dividing the U-phase, V-phase, and W-phase command voltages VU, VV, and VW by ½ of the power supply voltage VINV and a carrier signal (for example, a triangle wave signal). Switching control of the switches included in the inverter 32 is performed based on the generated drive signals. Accordingly, the output torque of the motor 31 is controlled by the steering command torque Ttgt.

Figure 10:
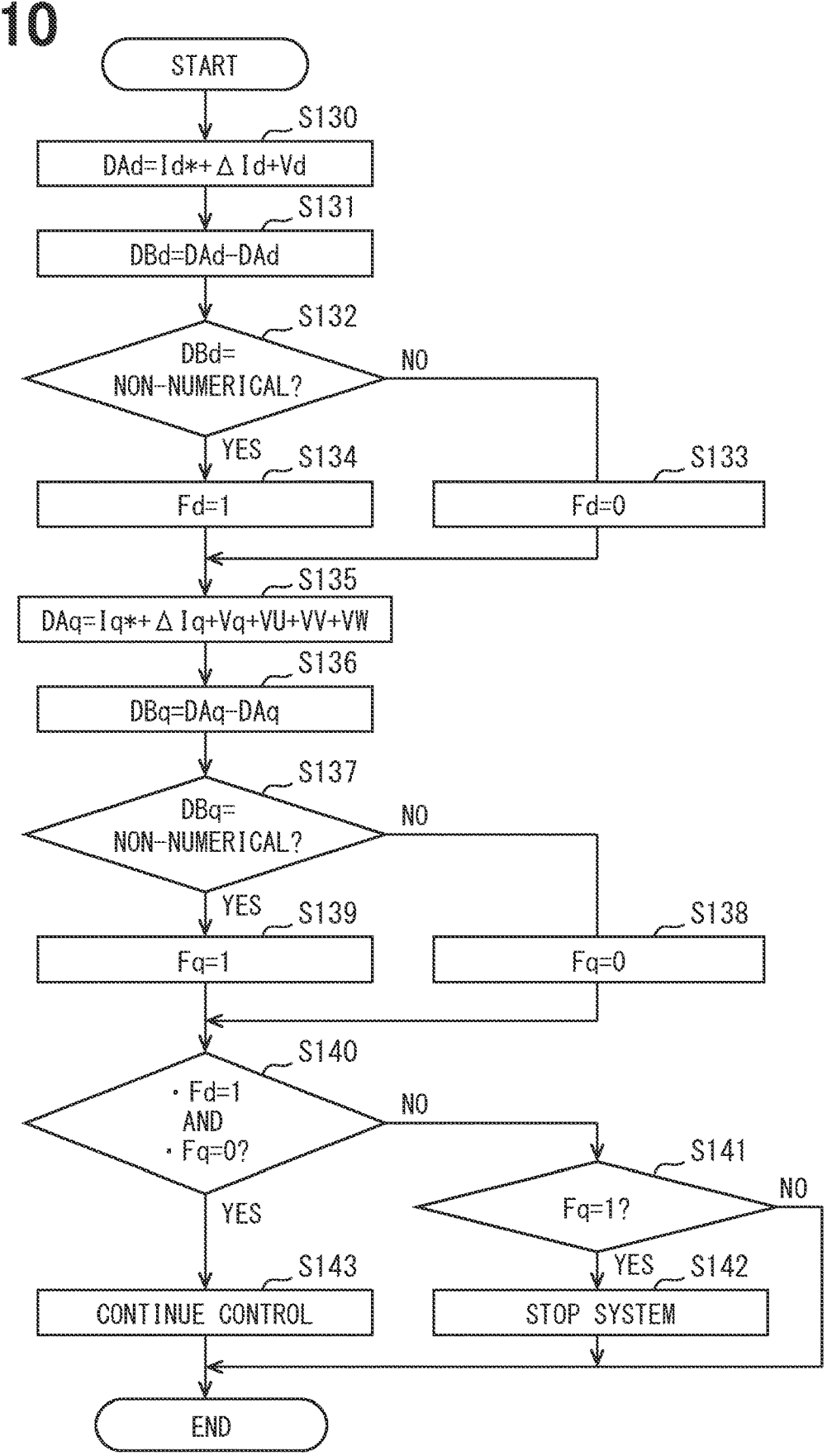
FIG. 10 is a flowchart showing a procedure of a check process in the torque control process.

The calculation data of the calculation blocks in a torque control process shown in FIG. 9 may include non-numerical data or infinite data. In this case, a reliability of steering control may decrease. Therefore, according to the present embodiment, a check process in the torque control process is executed. FIG. 10 shows a procedure of the check process executed by the control unit 34. The process is repeatedly executed in a predetermined control cycle.

In step S130, d-axis addition data DAd is calculated by adding the d-axis command current Id* calculated by the command current calculation unit 80, the d-axis current deviation ΔId calculated by the d-axis deviation calculation unit 82, and the d-axis command voltage Vd calculated by the d-axis command voltage calculation unit 84.

In step S131, d-axis determination data DBd is calculated by subtracting the d-axis addition data DAd calculated in step S130 from the d-axis addition data DAd calculated in step S130.

In step S132, a determination is made as to whether the d-axis determination data DBd calculated in step S131 is non-numerical. When the d-axis determination data DBd is determined to be not non-numerical in step S132, the process proceeds to step S133 and a d-axis flag Fd is set to 0. On the other hand, when the d-axis determination data DBd is determined to be non-numerical in step S132, the process proceeds to step S134 and the d-axis flag Fd is set to 1. Incidentally, when the d-axis determination data DBd is determined to be non-numerical in step S132 in N (N≥2) consecutive control cycles, the d-axis flag Fd may be set to 1.

After the process of step S133 or S134 is completed, the process proceeds to step S135, and q-axis addition data DAq is calculated by adding the q-axis command current Iq* calculated by the command current calculation unit 80, the q-axis current deviation ΔIq calculated by the q-axis deviation calculation unit 83, the q-axis command voltage Vq calculated by the q-axis command voltage calculation unit 85, and the command voltages VU, VV, and VW calculated by the three-phase conversion unit 86.

In step S136, q-axis determination data DBq is calculated by subtracting the q-axis addition data DAq calculated in step S135 from the q-axis addition data DAq calculated in step S135.

In step S137, a determination is made as to whether the q-axis determination data DBq calculated in step S136 is non-numerical. When the q-axis determination data DBq is determined to be not non-numerical in step S137, the process proceeds to step S138 and a q-axis flag Fq is set to 0. On the other hand, when the q-axis determination data DBq is determined to be non-numerical in step S137, the process proceeds to step S139 and the q-axis flag Fq is set to 1. According to the present embodiment, the processes of steps S132 and S137 correspond to a "determination unit". In addition, the q-axis flag Fq may be set to 1 when the q-axis determination data DBq is determined to be non-numerical in step S137 in the N (N 2) consecutive control cycles.

After the process of step S138 or S139 is completed, the process proceeds to step S140, and a determination is made as to whether the d-axis flag Fd is 1 and the q-axis flag Fq is 0. When a negative determination is made in step S140, the process proceeds to step S141, and a determination is made as to whether the q-axis flag Fq is 1. When a negative determination is made in step S141, no abnormality is determined in any of calculation processes related to a d-axis and a q-axis.

On the other hand, when an affirmative determination is made in step S141, an abnormality is determined in the calculation process related to the q-axis, the process proceeds to step S142, and steering control in the steering system 10 is stopped. Accordingly, the switching control of the inverter 32 is stopped.

When an affirmative determination is made in step S140, the process proceeds to step S143 to execute a fail-safe process. According to the present embodiment, as the fail-safe process, a process of setting the d-axis command voltage Vd input to the three-phase conversion unit 86 to 0 is executed. Accordingly, the switching control of the inverter 32 for causing the motor 31 to generate a steering torque can be continued, and thus a vehicle can continue to travel.

<Modifications of Fourth Embodiment>

In step S143 in FIG. 10, as a fail-safe process, instead of the process of setting the d-axis command voltage Vd to 0, for example, a process of setting the d-axis command voltage Vd input to the three-phase conversion unit 86 to a value of several percentages to several tens of percentages of the q-axis command voltage Vq calculated by the q-axis command voltage calculation unit 85 may be executed.

In step S130, calculation data used for calculating the d-axis addition data DAd is not limited to all of the d-axis command current Id*, the d-axis current deviation ΔId, and the d-axis command voltage Vd, and may be any two of three pieces of calculation data.

In step S135, calculation data used for calculating the q-axis addition data DAq is not limited to all of the q-axis command current Iq*, the q-axis current deviation ΔIq, the q-axis command voltage Vq, and the command voltages VU, VV, and VW, and may be a part and at least two of these pieces of calculation data. For example, as the calculation data used for calculating the q-axis addition data DAq, the calculation data obtained by excluding the command voltages VU, VV, and VW from the q-axis command current Iq*, the q-axis current deviation ΔIq, the q-axis command voltage Vq, and the command voltages VU, VV, and VW may be used.

For example, as described in the third embodiment, a determination may be made as to whether each calculation data in the torque control process shown in FIG. 9 infinite, instead of determining whether each calculation data is non-numerical.

Fifth Embodiment

Figure 11:
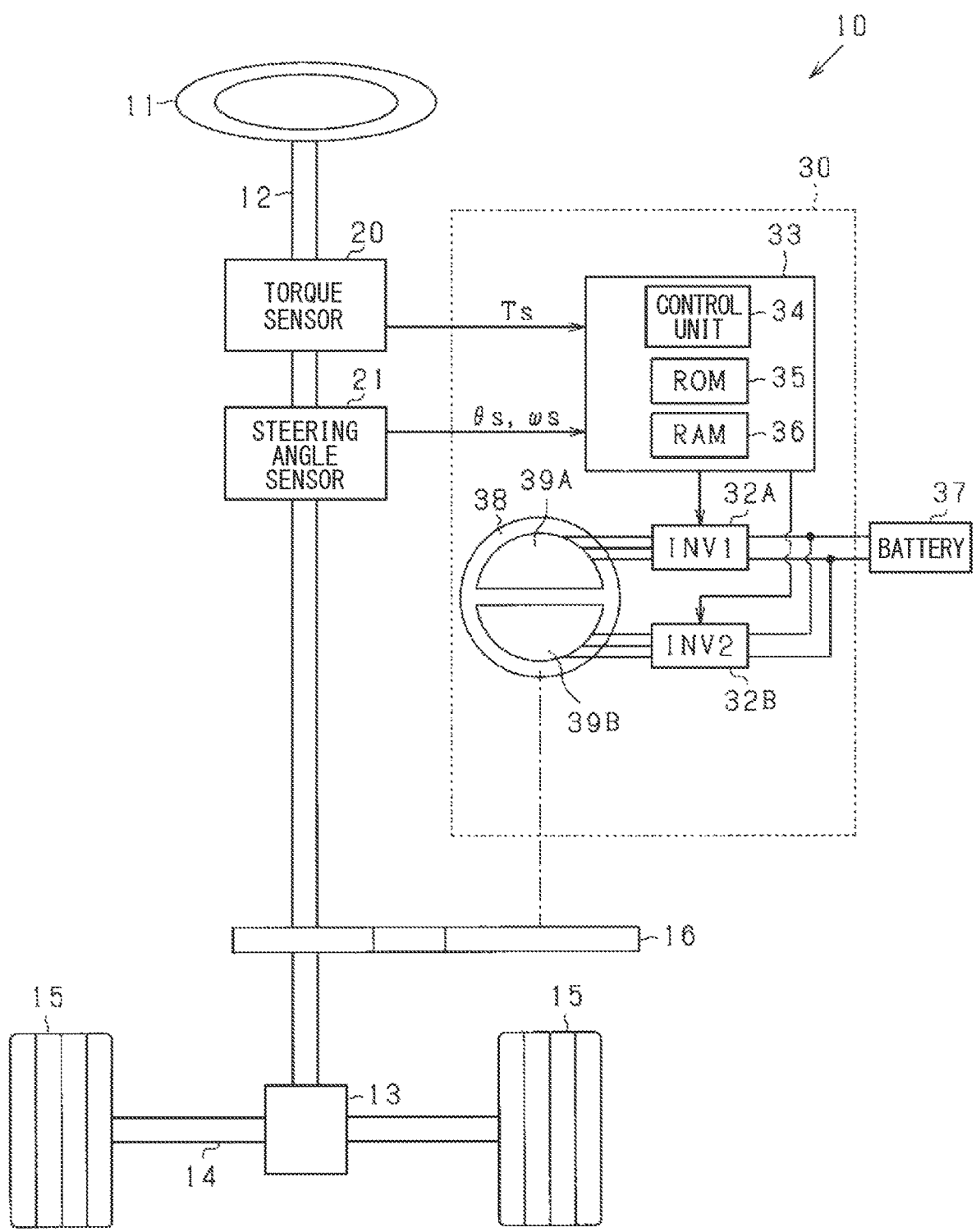
FIG. 11 is a configuration diagram of a steering system according to a fifth embodiment.

Hereinafter, a fifth embodiment will be described with reference to the drawings, focusing on differences from the first embodiment. According to the present embodiment, as shown in FIG. 11, the EPS device 30 includes a motor 38 having two stator winding groups. In FIG. 11, the same configurations as those shown in FIG. 1 are designated by the same reference numerals for convenience.

A rotation shaft of a rotor included in the motor 38 is connected to the steering shaft 12 via the reduction gear 16. On the other hand, the EPS device 30 includes a first inverter 32A and a second inverter 32B. The first inverter 32A is electrically connected to a first stator winding group 39A included in the motor 38. The second inverter 32B is electrically connected to a second stator winding group 39B included in the motor 38. According to the present embodiment, the first stator winding group 39A and the second stator winding group 39B are disposed to be shifted from each other by 30° with respect to an electrical angle. Electric power is supplied to the first and second stator winding groups 39A and 39B from the common battery 37 via the first and second inverters 32A and 32B. Accordingly, the motor 38 generates a torque in the steering shaft 12 to assist a driver in steering.

Figure 12:
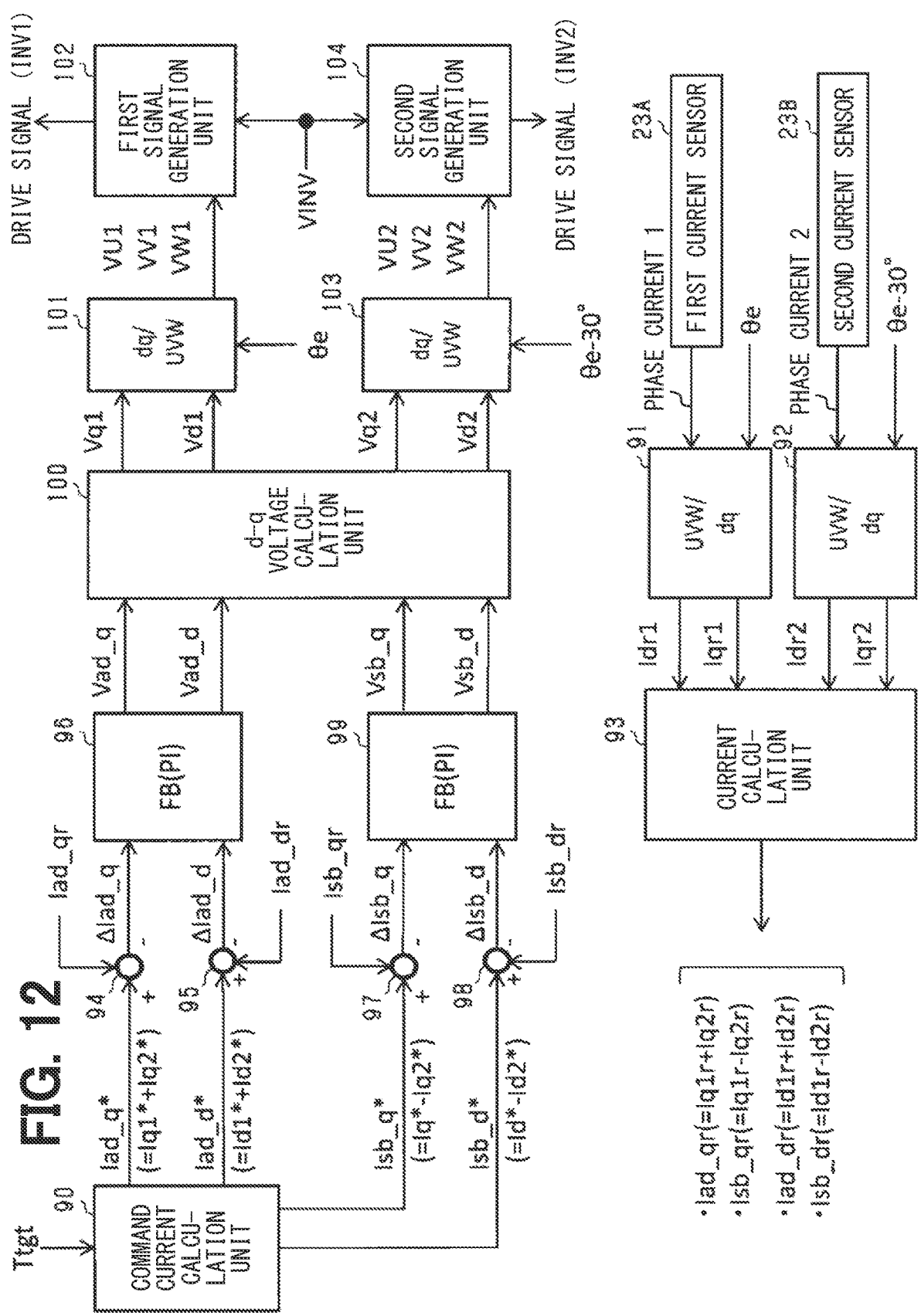
FIG. 12 is a block diagram showing a torque control process.

FIG. 12 shows a block diagram of a torque control process according to the present embodiment. The process shown in FIG. 12 includes multiple calculation blocks. Calculation data of each calculation block is stored in the RAM 36. Specifically, a command current calculation unit 90 calculates a q-axis command addition value Iad_q*, a d-axis command addition value Iad_d*, a q-axis command difference value Isb_q*, and a d-axis command difference value Isb_d* based on the steering command torque Ttgt calculated by the command value calculation unit 70.

The q-axis command addition value Iad_q* is a sum of a first q-axis command current Iq1* and a second q-axis command current Iq2*. The first q-axis command current Iq1* is a q-axis command current of a first system corresponding to the first stator winding group 39A, and the second q-axis command current Iq2* is a q-axis command current of a second system corresponding to the second stator winding group 39B. The first q-axis command current Iq1* and the second q-axis command current Iq2* are obtained by distributing the q-axis command current Iq* determined based on the steering command torque Ttgt.

The d-axis command addition value Iad_d* is a sum of a first d-axis command current Id1* and a second d-axis command current Id2*. The first d-axis command current Id1* is a d-axis command current of the first system, and the second d-axis command current Id2* is a d-axis command current of the second system. The first d-axis command current Id1* and the second d-axis command current Id2* are obtained by distributing the d-axis command current Id* determined based on the steering command torque Ttgt.

The q-axis command difference value Isb_q* is a difference between the first q-axis command current Iq1* and the second q-axis command current Iq2*. The d-axis command difference value Isb_d* is a difference between the first d-axis command current Id1* and the second d-axis command current Id2*. According to the present embodiment, the q-axis command difference value Isb_q* and the d-axis command difference value Isb_d* are set to 0.

A first two-phase conversion unit 91 converts U-phase, V-phase, and W-phase currents flowing through the first stator winding group 39A in a three-phase fixed coordinate system into a first d-axis current Id1$r$ and a first q-axis current Iq1$r$ in a d-q coordinate system based on a detection value of a first current sensor 23A and the electrical angle $\theta$e detected by the rotation angle sensor 24. The first current sensor 23A detects the currents of at least two of the U-phase, V-phase, and W-phase currents.

A second two-phase conversion unit 92 converts U-phase, V-phase, and W-phase currents flowing through the second stator winding group 39B in the three-phase fixed coordinate system into a second d-axis current Id2$r$ and a second q-axis current Iq2$r$ in the d-q coordinate system based on a detection value of a second current sensor 23B and "$\theta$e−30°". The second current sensor 23B detects the currents of at least two of the U-phase, V-phase, and W-phase currents.

A current calculation unit 93 calculates a q-axis addition value Iad_qr by adding the second q-axis current Iq2$r$ to the first q-axis current Iq1$r$, and calculates a d-axis addition value Iad_dr by adding the second d-axis current Id2$r$ to the first d-axis current Id1$r$. In addition, the current calculation unit 93 calculates a q-axis difference value Isb_qr by subtracting the second q-axis current Iq2$r$ from the first q-axis current Iq1$r$, and calculates a d-axis difference value Isb_dr by subtracting the second d-axis current Id2$r$ from the first d-axis current Id1$r$.

A q-axis sum deviation calculation unit 94 calculates a q-axis sum deviation ΔIad_q by subtracting the q-axis addition value Iad_qr from the q-axis command addition value Iad_q*. A d-axis sum deviation calculation unit 95 calculates a d-axis sum deviation ΔIad_d by subtracting the d-axis addition value Iad_dr from the d-axis command addition value Iad_d*.

A first command voltage calculation unit 96 calculates a q-axis command voltage sum Vad_q as an operation amount for feedback-controlling the q-axis addition value Iad_qr to the q-axis command addition value Iad_q* based on the q-axis sum deviation ΔIad_q. In addition, the first command voltage calculation unit 96 calculates a d-axis command voltage sum Vad_d as an operation amount for feedback-controlling the d-axis addition value Iad_dr to the d-axis command addition value Iad_d* based on the d-axis sum deviation ΔIad_d. The feedback control used in the first command voltage calculation unit 96 may be, for example, proportional integral control.

A q-axis difference deviation calculation unit 97 calculates a q-axis difference deviation ΔIsb_q by subtracting the q-axis difference value Isb_qr from the q-axis command difference value Isb_q*. A d-axis difference deviation calculation unit 98 calculates a d-axis difference deviation ΔIsb_d by subtracting the d-axis difference value Isb_dr from the d-axis command difference value Isb_d*.

A second command voltage calculation unit 99 calculates a q-axis command voltage difference Vsb_q as an operation amount for feedback-controlling the q-axis difference value Isb_qr to the q-axis command difference value Isb_q* based on the q-axis difference deviation ΔIsb_q. In addition, the second command voltage calculation unit 99 calculates a d-axis command voltage difference Vsb_d as an operation amount for feedback-controlling the d-axis difference value Isb_dr to the d-axis command difference value Isb_d* based on the d-axis difference deviation ΔIsb_d. The feedback control used in the second command voltage calculation unit 99 may be, for example, proportional integral control.

A d-q voltage calculation unit 100 calculates first d-axis and q-axis command voltages Vd1 and Vq1 of the first system and second d-axis and q-axis command voltages Vd2 and Vq2 of the second system based on the q-axis command voltage sum Vad_q, the d-axis command voltage sum Vad_d, the q-axis command voltage difference Vsb_q, and the d-axis command voltage difference Vsb_d.

A first three-phase conversion unit 101 converts the first d-axis and q-axis command voltages Vd1 and Vq1 in the d-q coordinate system into first U-phase, V-phase, and W-phase command voltages VU1, VV1, and VW1 in the three-phase fixed coordinate system based on the first d-axis and q-axis command voltages Vd1 and Vq1 and the electrical angle $\theta$e.

A first signal generation unit 102 generates drive signals for upper and lower arm switches in U, V, and W phases included in the first inverter 32A based on the first U-phase, V-phase, and W-phase command voltages VU1, VV1, and VW1 and the power supply voltage VINV detected by the voltage sensor 25. Based on the generated drive signals, switching control of the switches included in the first inverter 32A is performed.

A second three-phase conversion unit 103 converts the second d-axis and q-axis command voltages Vd2 and Vq2 in the d-q coordinate system into second U-phase, V-phase, and W-phase command voltages VU2, VV2, and VW2 in the three-phase fixed coordinate system based on the second d-axis and q-axis command voltages Vd2 and Vq2 and "$\theta$e−30°".

A second signal generation unit 104 generates drive signals for upper and lower arm switches in U, V, and W phases included in the second inverter 32B based on the second U-phase, V-phase, and W-phase command voltages VU2, VV2, and VW2 and the power supply voltage VINV. Based on the generated drive signals, switching control of the switches included in the second inverter 32B is performed.

Figure 13:
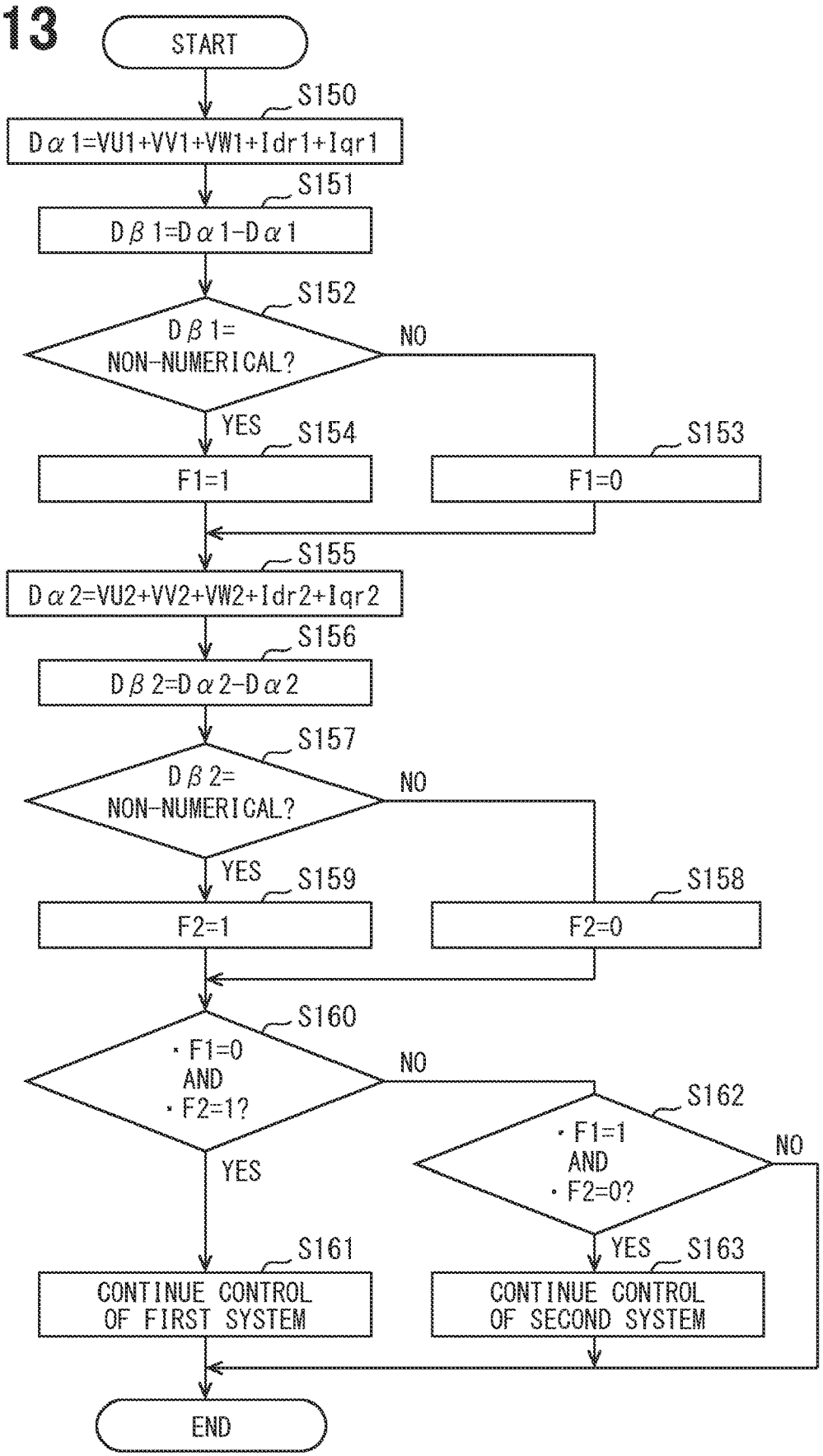
FIG. 13 is a flowchart showing a procedure of a check process in the torque control process.

The calculation data of the calculation blocks in the torque control process shown in FIG. 12 may include non-numerical data or infinite data. In this case, a reliability of steering control may decrease. Therefore, according to the present embodiment, a check process in the torque control process is executed. FIG. 13 shows a procedure of a check process executed by the control unit 34. The process is repeatedly executed in a predetermined control cycle.

In step S150, first addition data Dal is calculated by adding the first U-phase, V-phase, and W-phase command voltages VU1, VV1, and VW1 calculated by the first three-phase conversion unit 101 and the first d-axis and q-axis currents Id1$r$ and Iq1$r$ calculated by the first two-phase conversion unit 91. According to the present embodiment, the first three-phase conversion unit 101 and the first two-phase conversion unit 91 correspond to a "first calculation block".

In step S151, first determination data D$\beta$1 is calculated by subtracting the first addition data Dal calculated in step S150 from the first addition data Dal calculated in step S150.

In step S152, a determination is made as to whether the first determination data D$\beta$1 calculated in step S151 is non-numerical. When the first determination data D$\beta$1 is determined to be not non-numerical in step S152, the process proceeds to step S153 and a first flag F1 is set to 0. On the other hand, when the first determination data D$\beta$1 is determined to be non-numerical in step S152, the process proceeds to step S154 and the first flag F1 is set to 1. Incidentally, when the first determination data D$\beta$1 is determined to be non-numerical in step S152 in N (N≥2) consecutive control cycles, the first flag F1 may be set to 1.

After the process of step S153 or S154 is completed, the process proceeds to step S155, and second addition data D$\alpha$2 is calculated by adding the second U-phase, V-phase, and W-phase command voltages VU2, VV2, and VW2 calculated by the second three-phase conversion unit 103 and the second d-axis and q-axis currents Id2$r$ and Iq2$r$ calculated by the second two-phase conversion unit 92. According to the present embodiment, the second three-phase conversion unit 103 and the second two-phase conversion unit 92 correspond to a "second calculation block", and the process shown in FIG. 12 executed by the control unit 34 corresponds to a "drive calculation unit".

In step S156, second determination data D$\beta$2 is calculated by subtracting the second addition data D$\alpha$2 calculated in step S155 from the second addition data D$\alpha$2 calculated in step S155.

In step S157, a determination is made as to whether the second determination data D$\beta$2 calculated in step S156 is non-numerical. When the second determination data D$\beta$2 is determined to be not non-numerical in step S157, the process proceeds to step S158 and a second flag F2 is set to 0. On the other hand, when the second determination data D$\beta$2 is determined to be non-numerical in step S157, the process proceeds to step S159 and the second flag F2 is set to 1. Incidentally, when the second determination data D$\beta$2 is determined to be non-numerical in step S157 in the N (N≥2) consecutive control cycles, the second flag F2 may be set to 1.

In step S160, a determination is made as to whether the first flag F1 is 0 and the second flag F2 is 1. When an affirmative determination is made in step S160, an abnormality is determined in the second system, and the process proceeds to step S161. In step S161, the calculation process of the second signal generation unit 104, the second two-phase conversion unit 92, and the second command voltage calculation unit 99 is stopped, and a process of setting the q-axis command voltage difference Vsb_q and the d-axis command voltage difference Vsb_d that are output from the second command voltage calculation unit 99 to 0 is executed. Accordingly, the switching control of the second inverter 32B is stopped, and the switching control of the first inverter 32A is continued. As a result, the steering torque of the motor 38 can be prevented from being 0, and thus a vehicle can continue to travel.

When a negative determination is made in step S160, the process proceeds to step S162, and a determination is made as to whether the first flag F1 is 1 and the second flag F2 is 0. When a negative determination is made in step S162, no abnormality is determined in any of the first and second systems.

On the other hand, when an affirmative determination is made in step S162, an abnormality is determined in the first system, and the process proceeds to step S163. In step S163, the calculation process of the first signal generation unit 102, the first two-phase conversion unit 91, and the first command voltage calculation unit 96 is stopped, and a process of setting the q-axis command voltage sum Vad_q and the d-axis command voltage sum Vad_d that are output from the first command voltage calculation unit 96 to 0 is executed. Accordingly, the switching control of the first inverter 32A is stopped, and the switching control of the second inverter 32B is continued. As a result, the steering torque can be generated in the motor 38, and the vehicle can continue to travel.

Incidentally, when the calculation data of at least one of the current calculation unit 93, the first command voltage calculation unit 96, and the d-q voltage calculation unit 100 is determined to be non-numerical or infinite, the calculation process of the current calculation unit 93, the first command voltage calculation unit 96, and the d-q voltage calculation unit 100 is stopped. In this case, the switching control of the first and second inverters 32A and 32B is stopped.

<Modifications of Fifth Embodiment>

In step S150 in FIG. 13, the calculation data used for calculating the first addition data Dal is not limited to all of the first U-phase, V-phase, and W-phase command voltages VU1, VV1, and VW1 and the first d-axis and q-axis currents Id1$r$ and Iq1$r$, and may be a part and at least two of these pieces of calculation data.

In step S155, the calculation data used for calculating the second addition data D$\alpha$2 is not limited to all of the second U-phase, V-phase, and W-phase command voltages VU2, VV2, and VW2 and the second d-axis and q-axis currents Id2$r$ and Iq2$r$, and may be a part and at least two of these pieces of calculation data.

For example, as described in the third embodiment, a determination may be made as to whether each calculation data in the torque control process shown in FIG. 12 is infinite, instead of determining whether each calculation data is non-numerical.

When the d-axis command voltage sum Vad_d in the q-axis command voltage sum Vad_q and the d-axis command voltage sum Vad_d is determined to be non-numerical or infinite in the first command voltage calculation unit 96, the calculation process of the d-axis command voltage sum Vad_d in the first command voltage calculation unit 96 may be stopped.

When the first d-axis current Id1$r$ is determined to be non-numerical or infinite in the first two-phase conversion unit 91 and the second two-phase conversion unit 92, the first d-axis current Id1$r$ may be set to the same value as the second d-axis current Id2$r$. In addition, when the second d-axis current Id2$r$ is determined to be non-numerical or infinite, the second d-axis current Id2r may be set to the same value as the first d-axis current Id1r.

Sixth Embodiment

Figure 14:
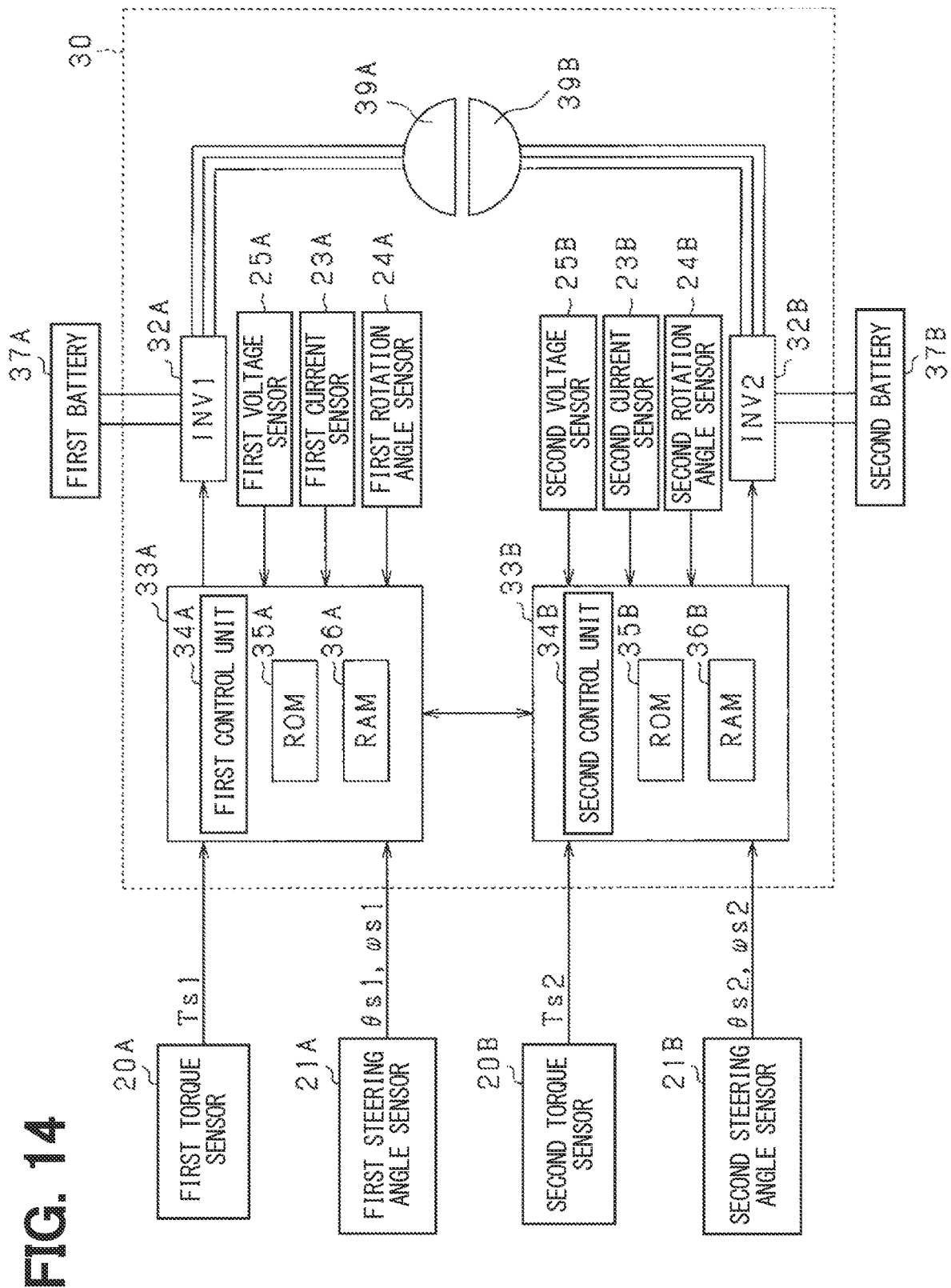
FIG. 14 is a configuration diagram of a steering system according to a sixth embodiment.

Hereinafter, a sixth embodiment will be described with reference to the drawings, focusing on differences from the fifth embodiment. According to the present embodiment, as shown in FIG. 14, a complete two-system EPS device is used as the EPS device 30. In FIG. 14, the same configurations as those shown in FIG. 11 are designated by the same reference numerals for convenience.

Electric power is supplied to the first stator winding group 39A from a first battery 37A via the first inverter 32A. Electric power is supplied to the second stator winding group 39B from a second battery 37B via the second inverter 32B.

The EPS device 30 includes a first electronic control device 33A and a second electronic control device 33B. According to the present embodiment, sensors corresponding to the electronic control devices 33A and 33B are made redundant. An input voltage (hereinafter referred to as a first power supply voltage VINV1) of the first inverter 32A detected by a first voltage sensor 25A, a detection value of the first current sensor 23A, and a first electrical angle θe1 of the motor 38 detected by a first rotation angle sensor 24A are input to the first electronic control device 33A. An input voltage (hereinafter referred to as a second power supply voltage VINV2) of the second inverter 32B detected by a second voltage sensor 25B, a detection value of the second current sensor 23B, and a second electrical angle θe2 of the motor 38 detected by a second rotation angle sensor 24B are input to the second electronic control device 33B.

A first steering torque Ts1 detected by a first torque sensor 20A, a first steering angle θs1 of the steering wheel 11 detected by a first steering angle sensor 21A, and a first steering angular velocity ωs1 that is a change speed in the first steering angle θs1 are input to the first electronic control device 33A. A second steering torque Ts2 detected by a second torque sensor 20B, a second steering angle θs2 of the steering wheel 11 detected by a second steering angle sensor 21B, and a second steering angular velocity ωs2 that is a change speed in the second steering angle θs2 are input to the second electronic control device 33B.

The first electronic control device 33A includes a first control unit 34A mainly including a CPU, a first ROM 35A, and a first RAM 36A that is a storage. The first control unit 34A performs steering control for controlling an output torque of the motor 38 corresponding to the first system to a first steering command torque Ttgt1 by calculating floating-point data in accordance with an instruction of a control program stored in the first ROM 35A.

The second electronic control device 33B includes a second control unit 34B mainly including a CPU, a second ROM 35B, and a second RAM 36B that is a storage. The second control unit 34B performs steering control for controlling an output torque of the motor 38 corresponding to the second system to a second steering command torque Ttgt2 by calculating the floating-point data in accordance with an instruction of a control program stored in the second ROM 35B.

According to the present embodiment, each of the first and second electronic control devices 33A and 33B includes the assist torque calculation unit 40, the compensation torque calculation unit 50, the control torque calculation unit 60, and the command value calculation unit 70 shown in FIG. 2. In the first electronic control device 33A, the first steering torque Ts1 is input to the assist torque calculation unit 40, the first steering angular velocity ωs1 is input to the compensation torque calculation unit 50, and the first steering angle θs1 is input to the control torque calculation unit 60. In addition, in the second electronic control device 33B, the second steering torque Ts2 is input to the assist torque calculation unit 40, the second steering angular velocity ωs2 is input to the compensation torque calculation unit 50, and the second steering angle θs2 is input to the control torque calculation unit 60. The steering command torque Ttgt calculated by the command value calculation unit 70 (corresponding to a "first command value calculation unit") of the first electronic control device 33A is the first steering command torque Ttgt1, and the steering command torque Ttgt calculated by the command value calculation unit 70 (corresponding to a "second command value calculation unit") of the second electronic control device 33B is the second steering command torque Ttgt2.

Figure 15:
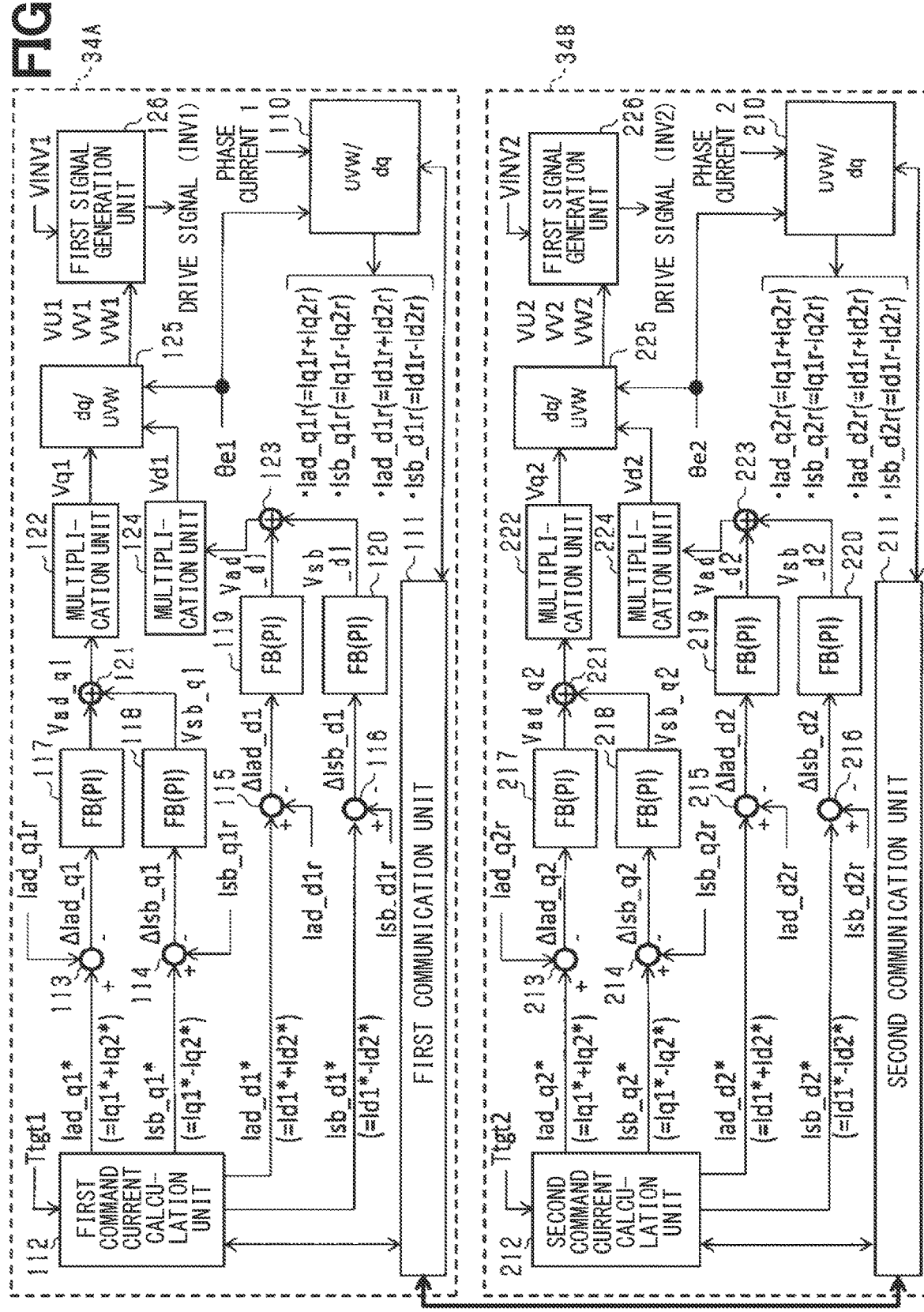
FIG. 15 is a block diagram showing a torque control process.

FIG. 15 shows a block diagram of a torque control process according to the present embodiment. In the torque control process, a process executed by each of the first and second control units 34A and 34B includes multiple calculation blocks. Calculation data of the calculation blocks of the first control unit 34A is stored in the first RAM 36A, and calculation data of the calculation blocks of the second control unit 34B is stored in the second RAM 36B.

In the first control unit 34A, a first two-phase conversion unit 110 converts the U-phase, V-phase, and W-phase currents flowing through the first stator winding group 39A in the three-phase fixed coordinate system into the first d-axis current Id1r and the first q-axis current Iq1r in the d-q coordinate system based on the detection value of the first current sensor 23A and the first electrical angle θe1 detected by the first rotation angle sensor 24A.

In the second control unit 34B, a second two-phase conversion unit 210 converts the U-phase, V-phase, and W-phase currents flowing through the second stator winding group 39B in the three-phase fixed coordinate system into the second d-axis current Id2r and the second q-axis current Iq2r in the d-q coordinate system based on the detection value of the second current sensor 23B and the second electrical angle θe2 (=θe1−30°) detected by the second rotation angle sensor 24B.

The first control unit 34A includes a first communication unit 111, and the second control unit 34B includes a second communication unit 211. The first communication unit 111 and the second communication unit 211 are communicably connected to each other.

The first two-phase conversion unit 110 receives the second d-axis current Id2r and the second q-axis current Iq2r from the second two-phase conversion unit 210 via the first communication unit 111 and the second communication unit 211. The first two-phase conversion unit 110 calculates a first q-axis addition value Iad_q1r by adding the second q-axis current Iq2r to the first q-axis current Iq1r, and calculates a first d-axis addition value Iad_d1r by adding the second d-axis current Id2r to the first d-axis current Id1r. In addition, the first two-phase conversion unit 110 calculates a first q-axis difference value Isb_q1r by subtracting the second q-axis current Iq2r from the first q-axis current Iq1r, and calculates a first d-axis difference value Isb_d1r by subtracting the second d-axis current Id2r from the first d-axis current Id1r.

The second two-phase conversion unit 210 receives the first d-axis current Id1r and the first q-axis current Iq1r from the first two-phase conversion unit 110 via the first communication unit 111 and the second communication unit 211.

The second two-phase conversion unit 210 calculates a second q-axis addition value Iad_q2r by adding the second q-axis current Iq2r to the first q-axis current Iq1r, and calculates a second d-axis addition value Iad_d2r by adding the second d-axis current Id2r to the first d-axis current Id1r. In addition, the second two-phase conversion unit 210 calculates a second q-axis difference value Isb_q2r by subtracting the second q-axis current Iq2r from the first q-axis current Iq1r, and calculates a second d-axis difference value Isb_d2r by subtracting the second d-axis current Id2r from the first d-axis current Id1r.

A first command current calculation unit 112 of the first control unit 34A and a second command current calculation unit 212 of the second control unit 34B can exchange information via the first communication unit 111 and the second communication unit 211. The first command current calculation unit 112 calculates the first d-axis and q-axis command currents Id1* and Iq1* based on the first steering command torque Ttgt1 calculated by the command value calculation unit 70 of the first control unit 34A. The second command current calculation unit 212 calculates the second d-axis and q-axis command currents Id2* and Iq2* based on the second steering command torque Ttgt2 calculated by the command value calculation unit 70 of the second control unit 34B.

The first command current calculation unit 112 calculates a first q-axis command addition value Iad_q1*, a first d-axis command addition value Iad_d1*, a first q-axis command difference value Isb_q1*, and a first d-axis command difference value Isb_d1*. The first q-axis command addition value Iad_q1* is a sum of the first q-axis command current Iq1* and the second q-axis command current Iq2*. The first d-axis command addition value Iad_d1* is a sum of the first d-axis command current Id1* and the second d-axis command current Id2*. The first q-axis command difference value Isb_q1* is a difference between the first q-axis command current Iq1* and the second q-axis command current Iq2*. The first d-axis command difference value Isb_d1* is a difference between the first d-axis command current Id1* and the second d-axis command current Id2*. According to the present embodiment, the first q-axis command difference value Isb_q1* and the first d-axis command difference value Isb_d1* are set to 0.

A first q-axis sum deviation calculation unit 113 calculates a first q-axis sum deviation ΔIad_q1 by subtracting the first q-axis addition value Iad_q1r from the first q-axis command addition value Iad_q1*. A first q-axis difference deviation calculation unit 114 calculates a first q-axis difference deviation ΔIsb_q1 by subtracting the first q-axis difference value Isb_q1r from the first q-axis command difference value Isb_q1*.

A first d-axis sum deviation calculation unit 115 calculates a first d-axis sum deviation ΔIad_d1 by subtracting the first d-axis addition value Iad_d1r from the first d-axis command addition value Iad_d1*. A first d-axis difference deviation calculation unit 116 calculates a first d-axis difference deviation ΔIsb_d1 by subtracting the first d-axis difference value Isb_d1r from the first d-axis command difference value Isb_d1*.

A first q-axis sum controller 117 calculates a first q-axis command voltage sum Vad_q1 as an operation amount for feedback-controlling the first q-axis addition value Iad_q1r to the first q-axis command addition value Iad_q1*. A first q-axis difference controller 118 calculates a first q-axis command voltage difference Vsb_q1 as an operation amount for feedback-controlling the first q-axis difference value Isb_q1r to the first q-axis command difference value Isb_q1*. A first d-axis sum controller 119 calculates a first d-axis command voltage sum Vad_d1 as an operation amount for feedback-controlling the first d-axis addition value Iad_d1r to the first d-axis command addition value Iad_d1*. A first d-axis difference controller 120 calculates a first d-axis command voltage difference Vsb_d1 as an operation amount for feedback-controlling the first d-axis difference value Isb_d1r to the first d-axis command difference value Isb_d1*. The feedback control used in each of the controllers 117 to 120 may be, for example, proportional integral control.

A first q-axis addition unit 121 adds the first q-axis command voltage sum Vad_q1 and the first q-axis command voltage difference Vsb_q1. A first q-axis multiplication unit 122 calculates the first q-axis command voltage Vq1 by multiplying "Vad_q1+Vsb_q1" calculated by the first q-axis addition unit 121 by ½.

A first d-axis addition unit 123 adds the first d-axis command voltage sum Vad_d1 and the first d-axis command voltage difference Vsb_d1. A first d-axis multiplication unit 124 calculates the first d-axis command voltage Vd1 by multiplying "Vad_d1+Vsb_d1" calculated by the first d-axis addition unit 123 by ½.

A first three-phase conversion unit 125 converts the first d-axis and q-axis command voltages Vd1 and Vq1 in the d-q coordinate system into the first U-phase, V-phase, and W-phase command voltages VU1, VV1, and VW1 in the three-phase fixed coordinate system based on the first d-axis and q-axis command voltages Vd1 and Vq1 and the first electrical angle θe1.

A first signal generation unit 126 generates drive signals for upper and lower arm switches in U, V, and W phases included in the first inverter 32A based on the first U-phase, V-phase, and W-phase command voltages VU1, VV1, and VW1 and the first power supply voltage VINV1 detected by the first voltage sensor 25A. Based on the generated drive signals, switching control of the switches included in the first inverter 32A is performed.

On the other hand, in the second control unit 34B, the second command current calculation unit 212 calculates a second q-axis command addition value Iad_q2*, a second d-axis command addition value Iad_d2*, a second q-axis command difference value Isb_q2*, and a second d-axis command difference value Isb_d2*. The second q-axis command addition value Iad_q2* is a sum of the first q-axis command current Iq1* and the second q-axis command current Iq2*. The second d-axis command addition value Iad_d2* is a sum of the first d-axis command current Id1* and the second d-axis command current Id2*. The second q-axis command difference value Isb_q2* is a difference between the first q-axis command current Iq1* and the second q-axis command current Iq2*. The second d-axis command difference value Isb_d2* is a difference between the first d-axis command current Id1* and the second d-axis command current Id2*. According to the present embodiment, the second q-axis command difference value Isb_q2* and the second d-axis command difference value Isb_d2* are set to 0.

A second q-axis sum deviation calculation unit 213 calculates a second q-axis sum deviation ΔIad_q2 by subtracting the second q-axis addition value Iad_q2r from the second q-axis command addition value Iad_q2*. A second q-axis difference deviation calculation unit 214 calculates a second q-axis difference deviation ΔIsb_q2 by subtracting the second q-axis difference value Isb_q2r from the second q-axis command difference value Isb_q2*.

A second d-axis sum deviation calculation unit 215 calculates a second d-axis sum deviation ΔIad_d2 by subtracting the second d-axis addition value Iad_d2r from the second d-axis command addition value Iad_d2*. A second d-axis difference deviation calculation unit 216 calculates a second d-axis difference deviation ΔIsb_d2 by subtracting the second d-axis difference value Isb_d2r from the second d-axis command difference value Isb_d2*.

A second q-axis sum controller 217 calculates a second q-axis command voltage sum Vad_q2 as an operation amount for feedback-controlling the second q-axis addition value Iad_q2r to the second q-axis command addition value Iad_q2*. A second q-axis difference controller 218 calculates a second q-axis command voltage difference Vsb_q2 as an operation amount for feedback-controlling the second q-axis difference value Isb_q2r to the second q-axis command difference value Isb_q2*. A second d-axis sum controller 219 calculates a second d-axis command voltage sum Vad_d2 as an operation amount for feedback-controlling the second d-axis addition value Iad_d2r to the second d-axis command addition value Iad_d2*. A second d-axis difference controller 220 calculates a second d-axis command voltage difference Vsb_d2 as an operation amount for feedback-controlling the second d-axis difference value Isb_d2r to the second d-axis command difference value Isb_d2*. The feedback control used in each of the controllers 217 to 220 may be, for example, proportional integral control.

A second q-axis addition unit 221 adds the second q-axis command voltage sum Vad_q2 and the second q-axis command voltage difference Vsb_q2. A second q-axis multiplication unit 222 calculates the second q-axis command voltage Vq2 by multiplying "Vad_q2+Vsb_q2" calculated by the second q-axis addition unit 221 by ½.

A second d-axis addition unit 223 adds the second d-axis command voltage sum Vad_d2 and the second d-axis command voltage difference Vsb_d2. A second d-axis multiplication unit 224 calculates the second d-axis command voltage Vd2 by multiplying "Vad_d2+Vsb_d2" calculated by the second d-axis addition unit 223 by ½.

A second three-phase conversion unit 225 converts the second d-axis and q-axis command voltages Vd2 and Vq2 in the d-q coordinate system into the second U-phase, V-phase, and W-phase command voltages VU2, VV2, and VW2 in the three-phase fixed coordinate system based on the second d-axis and q-axis command voltages Vd2 and Vq2 and the second electrical angle θe2.

A second signal generation unit 226 generates drive signals for upper and lower arm switches in U, V, and W phases included in the second inverter 32B based on the second U-phase, V-phase, and W-phase command voltages VU2, VV2, and VW2 and the second power supply voltage VINV2 detected by the second voltage sensor 25B. Based on the generated drive signals, switching control of the switches included in the second inverter 32B is performed.

The calculation data of the calculation blocks in the torque control process shown in FIG. 15 may include non-numerical data or infinite data. In this case, a reliability of steering control may decrease. Therefore, according to the present embodiment, a check process in the torque control process is executed.

First, the check process executed by the first control unit 34A will be described with reference to FIG. 16. The process is repeatedly executed in a predetermined control cycle.

In step S170, the first addition data Dal is calculated by adding the following calculation data (A1) to (A7) stored in the first RAM 36A.

(A1) the first q-axis addition value Iad_q1r, the first d-axis addition value Iad_d1r, the first q-axis difference value Isb_q1r, and the first d-axis difference value Isb_d1r that are calculated by the first two-phase conversion unit 110

(A2) the first q-axis command addition value Iad_q1*, the first d-axis command addition value Iad_d1*, the first q-axis command difference value Isb_q1*, and the first d-axis command difference value Isb_d1* that are calculated by the first command current calculation unit 112

(A3) the first q-axis sum deviation ΔIad_q1, the first q-axis difference deviation ΔIsb_q1, the first d-axis sum deviation ΔIad_d1, and the first d-axis difference deviation Isb_d1 that are calculated by the calculation units 113 to 116

(A4) the first q-axis command voltage sum Vad_q1, the first q-axis command voltage difference Vsb_q1, the first d-axis command voltage sum Vad_d1, and the first d-axis command voltage difference Vsb_d1 that are calculated by the controllers 117 to 120

(A5) "Vad_q1+Vsb_q1" calculated by the first q-axis addition unit 121 and "Vad_d1+Vsb_d1" calculated by the first d-axis addition unit 123

(A6) the first d-axis and q-axis command voltages Vd1 and Vq1 calculated by the multiplication units 122 and 124

(A7) the first U-phase, V-phase, W-phase command voltages VU1, VV1, and VW1 calculated by the first three-phase conversion unit 125

According to the present embodiment, the processes other than the first communication unit 111 among the processes executed by the first control unit 34A shown in FIG. 15 correspond to a "first calculation block". In addition, the processes shown in FIG. 15 executed by the first control unit 34A correspond to a "first drive calculation unit".

In step S171, the first determination data Dβ1 is calculated by subtracting the first addition data Dal calculated in step S170 from the first addition data Dal calculated in step S170.

In step S172, a determination is made as to whether the first determination data Dβ1 calculated in step S171 is non-numerical. When the first determination data Dβ1 is determined to be not non-numerical in step S172, the process proceeds to step S173 and the first flag F1 is set to 0. On the other hand, when the first determination data Dβ1 is determined to be non-numerical in step S172, the process proceeds to step S174, and the first flag F1 is set to 1. The second control unit 34B is notified via the first communication unit 111 and the second communication unit 211 of an abnormality in the first system. In addition, a calculation process of the first control unit 34A shown in FIG. 15 is stopped, and the switching control of the first inverter 32A is stopped.

After the abnormality is notified of, the switching control of the second inverter 32B is continued while the communication between the first communication unit 111 and the second communication unit 211 is enabled. As a result, the steering torque can be generated in the motor 38, and the vehicle can continue to travel.

Incidentally, when the first determination data Dβ1 is determined to be non-numerical in step S172 in N (N≥2) consecutive control cycles, the first flag F1 may be set to 1.

Subsequently, a check process executed by the second control unit 34B will be described with reference to FIG. 17. The process is repeatedly executed in a predetermined control cycle.

In step S180, the second addition data Dα2 is calculated by adding the following calculation data (B1) to (B7) stored in the second RAM 36B.

(B1) the second q-axis addition value Iad_q2r, the second d-axis addition value Iad_d2r, the second q-axis difference value Isb_q2r, and the second d-axis difference value Isb_d2r that are calculated by the second two-phase conversion unit 210

(B2) the second q-axis command addition value Iad_q2*, the second d-axis command addition value Iad_d2*, the second q-axis command difference value Isb_q2*, and the second d-axis command difference value Isb_d2* that are calculated by the second command current calculation unit 212

(B3) the second q-axis sum deviation Iad_q2, the second q-axis difference deviation Isb_q2, the second d-axis sum deviation ΔIad_d2, and the second d-axis difference deviation ΔIsb_d2 that are calculated by the calculation units 213 to 216

(B4) the second q-axis command voltage sum Vad_q2, the second q-axis command voltage difference Vsb_q2, the second d-axis command voltage sum Vad_d2, and the second d-axis command voltage difference Vsb_d2 that are calculated by the controllers 217 to 220

(B5) "Vad_q2+Vsb_q2" calculated by the second q-axis addition unit 221 and "Vad_d2+Vsb_d2" calculated by the second d-axis addition unit 223

(B6) the second d-axis and q-axis command voltages Vd2 and Vq2 calculated by the multiplication units 222 and 224

(B7) the second U-phase, V-phase, and W-phase command voltages VU2, VV2, and VW2 calculated by the second three-phase conversion unit 225

According to the present embodiment, the processes other than the second communication unit 211 among the processes executed by the second control unit 34B shown in FIG. 15 correspond to a "second calculation block". In addition, the processes shown in FIG. 15 executed by the second control unit 34B correspond to a "second drive calculation unit".

In step S181, the second determination data Dβ2 is calculated by subtracting the second addition data Dα2 calculated in step S180 from the second addition data Dα2 calculated in step S180.

In step S182, a determination is made as to whether the second determination data Dβ2 calculated in step S181 is non-numerical. When the second determination data Dβ2 is determined to be not non-numerical in step S182, the process proceeds to step S183 and the second flag F2 is set to 0. On the other hand, when the second determination data Dβ2 is determined to be non-numerical in step S182, the process proceeds to step S184, and the second flag F2 is set to 1. The first control unit 34A is notified via the second communication unit 211 and the first communication unit 111 of an abnormality in the second system. In addition, a calculation process of the second control unit 34B shown in FIG. 15 is stopped, and the switching control of the second inverter 32B is stopped.

After the abnormality is notified of, the switching control of the first inverter 32A is continued while the communication between the first communication unit 111 and the second communication unit 211 is enabled. As a result, the steering torque can be generated in the motor 38, and the vehicle can continue to travel.

Incidentally, when the second determination data Dβ2 is determined to be non-numerical in step S182 in the N (N≥2) consecutive control cycles, the second flag F2 may be set to 1.

<Modifications of Sixth Embodiment>

Figure 16:
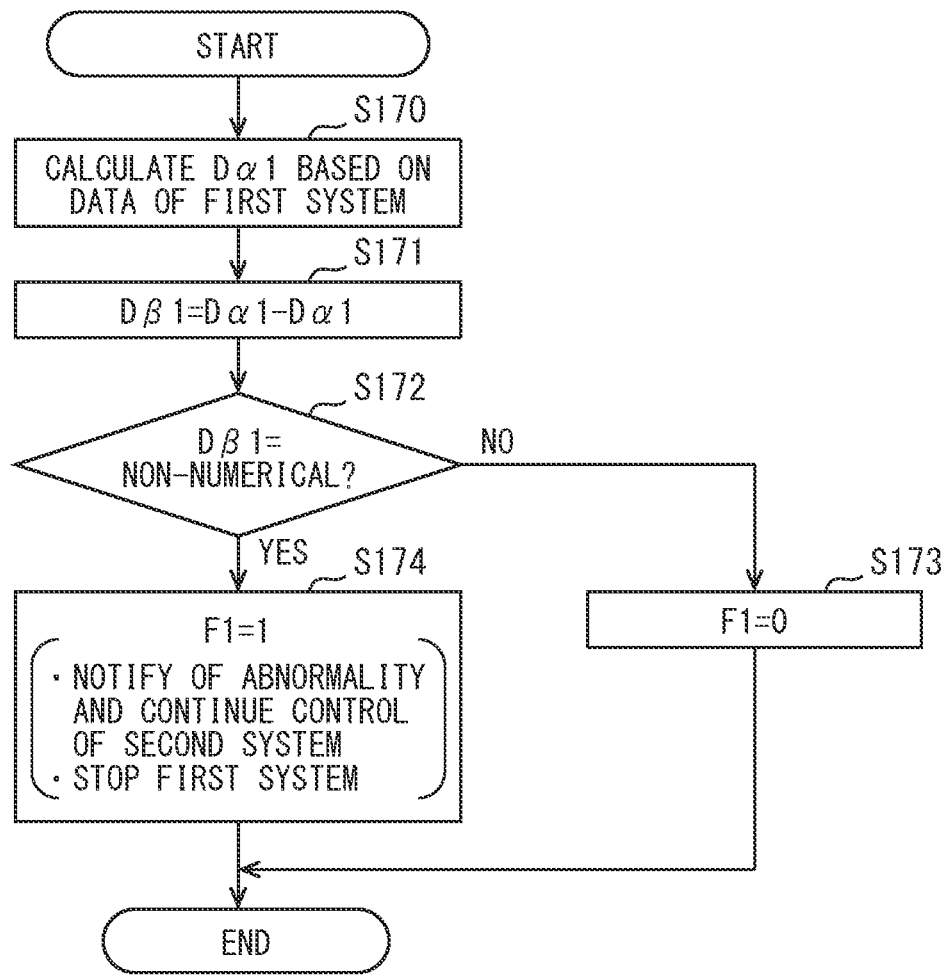
FIG. 16 is a flowchart showing a procedure of a check process in the torque control process.

In step S170 in FIG. 16, calculation data used for calculating the first addition data Dα1 is not limited to all of (A1) to (A7), and may be a part and at least two of these pieces of calculation data.

Figure 17:
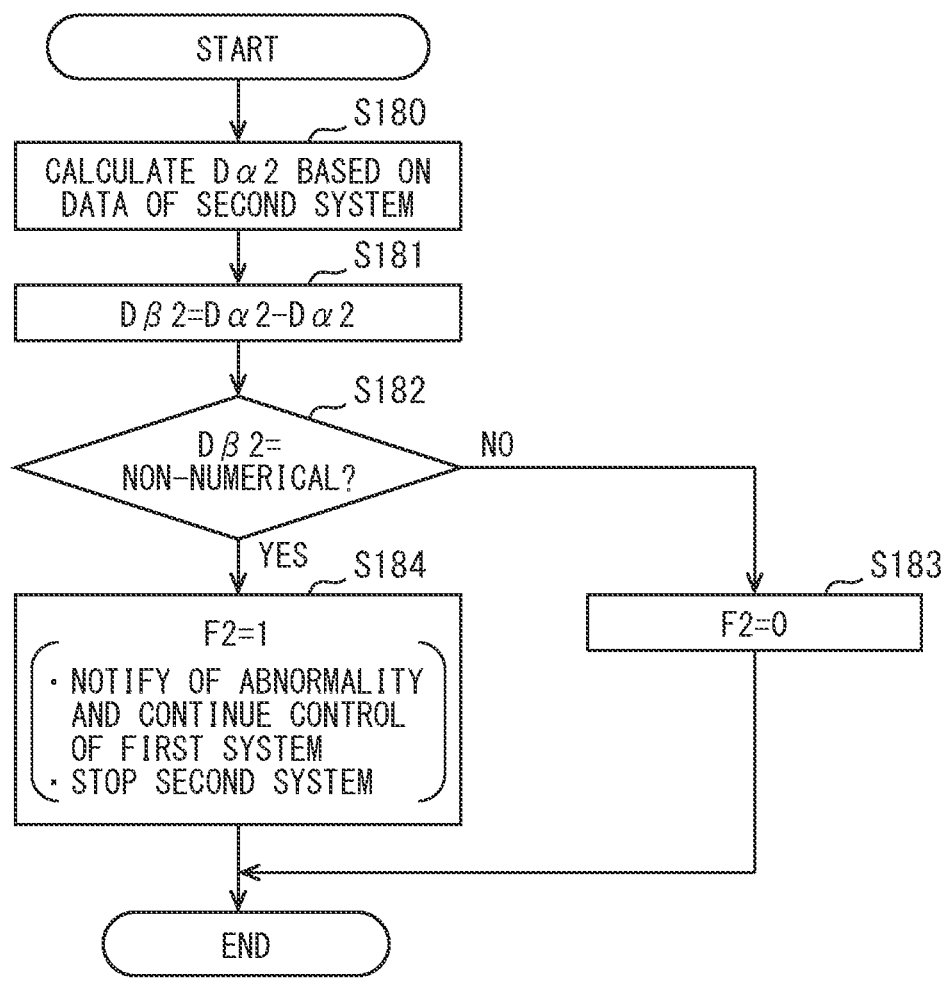
FIG. 17 is a flowchart showing a procedure of a check process in the torque control process.

In step S180 in FIG. 17, calculation data used for calculating the second addition data Dα2 is not limited to all of (B1) to (B7), and may be a part and at least two of these pieces of calculation data.

For example, as described in the third embodiment, a determination may be made as to whether each calculation data in the torque control process shown in FIG. 15 is infinite, instead of determining whether each calculation data is non-numerical.

When the calculation data of the process related to the d-axis is determined to be non-numerical in the processes of the control units 34A and 34B shown in FIG. 15, switching control of an inverter may be continued based on the calculation data of the process related to the q-axis. Hereinafter, the first control unit 34A will be described as an example with reference to FIG. 10.

In step S130, the d-axis addition data DAd is calculated by adding the following calculation data (C1) to (C7) stored in the first RAM 36A.

(C1) the first q-axis addition value Iad_q1r and the first q-axis difference value Isb_q1r that are calculated by the first two-phase conversion unit 110

(C2) the first q-axis command addition value Iad_q1* and the first q-axis command difference value Isb_q1* that are calculated by the first command current calculation unit 112

(C3) the first q-axis sum deviation ΔIad_q1 and the first q-axis difference deviation ΔIsb_q1 that are calculated by the calculation units 113 and 114

(C4) the first q-axis command voltage sum Vad_q1 and the first q-axis command voltage difference Vsb_q1 that are calculated by the controllers 117 and 118

(C5) "Vad_q1+Vsb_q1" calculated by the first q-axis addition unit 121

(C6) the first q-axis command voltage Vq1 calculated by the first q-axis multiplication unit 122

(C7) the first U-phase, V-phase, and W-phase command voltages VU1, VV1, and VW1 calculated by the first three-phase conversion unit 125

In step S135, the q-axis addition data DAq is calculated by adding the following calculation data (D1) to (D6) stored in the first RAM 36A.

(D1) the first d-axis addition value Iad_d1r and the first d-axis difference value Isb_d1r that are calculated by the first two-phase conversion unit 110

(D2) the first d-axis command addition value Iad_d1* and the first d-axis command difference value Isb_d1* that are calculated by the first command current calculation unit 112

(D3) the first d-axis sum deviation ΔIad_d1 and the first d-axis difference deviation ΔIsb_d1 that are calculated by the calculation units 115 and 116

(D4) the first d-axis command voltage sum Vad_d1 and the first d-axis command voltage difference Vsb_d1 that are calculated by the controllers 119 and 120

(D5) "Vad_d1+Vsb_d1" calculated by the first d-axis addition unit 123

(D6) the first d-axis command voltage Vd1 calculated by the first d-axis multiplication unit 124

In step S143, the first d-axis command voltage Vd1 input to the first three-phase conversion unit 125 is set to 0. The above process can be similarly applied to the second control unit 34B.

Incidentally, the calculation data used for calculating the d-axis addition data DAd is not limited to all of (C1) to (C7), and may be a part and at least two of these pieces of calculation data.

In addition, the calculation data used for calculating the q-axis addition data DAq is not limited to all of (D1) to (D6), and may be a part and at least two of these pieces of calculation data.

OTHER EMBODIMENTS

The above embodiments may be changed and carried out as follows.

Figure 4:
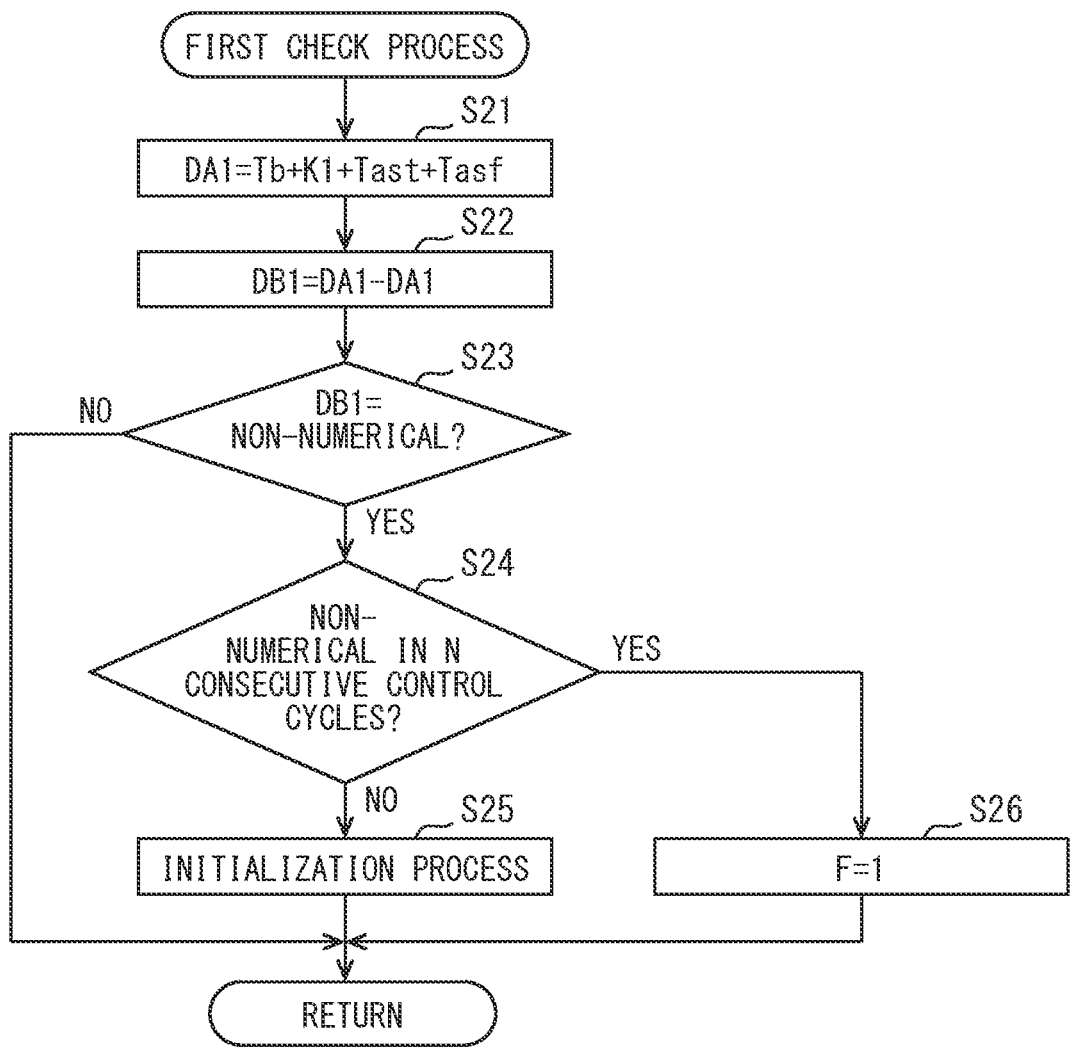
FIG. 4 is a flowchart showing a procedure of a first check process.

In step S21 in FIG. 4, the first addition data DA1 may be calculated using a part and two or more pieces of calculation data without using all of the calculation data among the basic torque Tb, the first coefficient K1, the basic assist torque Tast, and the assist torque Tasf. In this case, in step S25, an initialization process of the calculation data used for calculating the first addition data DA1 among the basic torque Tb, the first coefficient K1, the basic assist torque Tast, and the assist torque Tasf may be executed. The same applies to the compensation torque calculation unit 50 and the control torque calculation unit 60.

The processes of steps S24 and S25 in FIG. 4 may be deleted. In this case, when an affirmative determination is made in step S23, the process may proceed to step S26. In addition, the processes of steps S54 and S55 in FIG. 5 may be deleted. In this case, when an affirmative determination is made in step S53, the process may proceed to step S56. In addition, the processes of steps S84 and S85 in FIG. 6 may be deleted. In this case, when an affirmative determination is made in step S83, the process may proceed to step S86.

Step S110 in FIG. 3 may be deleted. In this case, even when a negative determination is made in steps S30, S60, and S90, steering control in the steering system 10 may not be stopped.

The EPS device is not limited to one including a motor and an inverter in one system, and for example, may be one including a motor and an inverter in two systems.

A steering system may be mounted on a vehicle capable of traveling by full-autonomous driving. In this case, for example, the assist torque calculation unit 40 and the compensation torque calculation unit 50 in FIG. 2 may be deleted from the process of the electronic control device 33.

A control target of an electronic control device may be, for example, a motor included in a steer-by-wire steering device or an in-wheel motor. In this case, a control amount may be, for example, a torque or a current command value corresponding to the torque (for example, d-axis and q-axis current command values).

The control amount is not limited to the torque, and may be, for example, a rotation speed of a motor. In addition, the control target is not limited to the motor.

The control units and methods thereof described in the present disclosure may be implemented by a dedicated computer including a processor programmed to execute one or more functions embodied by a computer program and a memory. Alternatively, the control units and the methods thereof described in the present disclosure may be implemented by a dedicated computer including a processor with one or more dedicated hardware logic circuits. Alternatively, the control units and the methods thereof described in the present disclosure may be implemented by one or more dedicated computers configured with a combination of a processor programmed to execute one or more functions, a memory, and a processor configured with one or more hardware logic circuits. In addition, the computer program may be stored in a computer-readable non-transitional tangible recording medium as an instruction executed by a computer.

Although the present disclosure has been described in accordance with the embodiments, it is understood that the present disclosure is not limited to the embodiments or the structures. The present disclosure encompasses various modifications and variations within the scope of equivalents. In addition, various combinations or forms as well as other combinations or forms including only one element, one or more elements, or one or less elements, fall within the scope or the spirit of the present disclosure.

What is claimed is:

1. An electronic control device provided with a plurality of calculation blocks that calculate floating-point data, the electronic control device comprising:
   a storage configured to store calculation data items of the plurality of calculation blocks;
   a command value calculation unit configured to calculate a command value of a control amount for a control target based on the calculation data items of the plurality of calculation blocks;
   a determination value calculation unit configured to, before the command value calculation unit calculates the command value, (i) calculate addition data of calculation data items of at least two of the plurality of calculation blocks among the calculation data items stored in the storage, and (ii) calculate determination data obtained by subtracting the addition data from the addition data;
   a determination unit configured to execute, as a determination process, a process of determining whether the determination data is non-numerical before the command value calculation unit calculates the command value; and
   a processing unit configured to execute an initialization process on a calculation data item determined as being non-numerical among the calculation data items stored in the storage before the command value calculation unit calculates the command value, wherein
   the electronic control device is applied to a steering device,
   the control target is a motor that includes first and second stator winding groups and that generates a steering torque as the control amount,
   the steering device includes
      the motor,
      a first inverter electrically connected to the first stator winding group, and
      a second inverter electrically connected to the second stator winding group, the electronic control device further comprises
      a drive calculation unit that includes a first calculation block and a second calculation block, and is configured to (i) execute a calculation process of performing switching control of the first inverter based on the command value and a calculation data item of the first calculation block, and (ii) execute a calculation process of performing switching control of the second inverter based on the command value and a calculation data item of the second calculation block,
   the storage stores the calculation data items of the first calculation block and the second calculation block,
   the determination value calculation unit calculates determination data of the first calculation block and determination data of the second calculation block before the command value calculation unit calculates the command value, the determination unit determines whether each of the determination data of the first calculation block and the determination data of the second calculation block is non-numerical, the drive calculation unit stops the calculation process of performing the switching control of the first inverter and continues the calculation process of performing the switching control of the second inverter when the determination unit determines that the determination data of the first calculation block between the first calculation block and the second calculation block is non-numerical, and the drive calculation unit stops the calculation process of performing the switching control of the second inverter and continues the calculation process of performing the switching control of the first inverter when the determination unit determines that the determination data of the second calculation block between the first calculation block and the second calculation block is non-numerical.

2. The electronic control device according to claim 1, wherein each of groups into which the plurality of calculation blocks are divided is provided as a partial command value calculation unit configured to calculate a partial command value for the control target based on a calculation data item of a calculation block included in the group, the command value calculation unit calculates the command value based on the partial command value calculated by each partial command value calculation unit, the determination value calculation unit calculates determination data of each partial command value calculation unit before the command value calculation unit calculates the command value, the determination process is a process of determining whether the determination data calculated in each partial command value calculation unit is non-numerical, and the processing unit executes the initialization process on the calculation data item of the calculation block included in the partial command value calculation unit determined as being non-numerical among the calculation data items stored in the storage.

3. The electronic control device according to claim 1, wherein the command value calculation unit continues controlling the control amount until the determination unit determines that the determination data is non-numerical in each of a plurality of control cycles that are consecutive, and the command value calculation unit stops controlling the control amount when the determination unit determines that the determination data is non-numerical in each of the plurality of control cycles.

4. A steering system comprising:
the electronic control device according to claim 1, and the steering device.

5. An electronic control device provided with a plurality of calculation blocks that calculate floating-point data, the electronic control device comprising:

a storage configured to store calculation data items of the plurality of calculation blocks;

a command value calculation unit configured to calculate a command value of a control amount for a control target based on the calculation data items of the plurality of calculation blocks;

a determination value calculation unit configured to, before the command value calculation unit calculates the command value, (i) calculate addition data of calculation data items of at least two of the plurality of calculation blocks among the calculation data items stored in the storage, and (ii) calculate determination data obtained by subtracting the addition data from the addition data;

a determination unit configured to execute, as a determination process, a process of determining whether the determination data is non-numerical before the command value calculation unit calculates the command value; and a processing unit configured to execute an initialization process on a calculation data item determined as being non-numerical among the calculation data items stored in the storage before the command value calculation unit calculates the command value, the electronic control device is applied to a steering device, the control target is a motor that includes first and second stator winding groups and that generates a steering torque as the control amount, the steering device includes
the motor,
a first inverter electrically connected to the first stator winding group, and
a second inverter electrically connected to the second stator winding group, the command value calculation unit includes
a first command value calculation unit configured to calculate a first command value of the steering torque as the command value, and
a second command value calculation unit configured to calculate a second command value of the steering torque as the command value, the electronic control device further comprises
a first drive calculation unit that includes a first calculation block, and is configured to execute a calculation process of performing switching control of the first inverter based on the first command value and a calculation data item of the first calculation block, and
a second drive calculation unit that includes a second calculation block, and is configured to execute a calculation process of performing switching control of the second inverter based on the second command value and a calculation data item of the second calculation block, the storage stores the calculation data item of the first calculation block and the calculation data item of the second calculation block, the determination value calculation unit calculates (i) determination data of the first calculation block before the first command value calculation unit calculates the first command value, and (ii) determination data of the second calculation block before the second command value calculation unit calculates the second command value, the determination unit determines whether each of the determination data of the first calculation block and the determination data in of the second calculation block is non-numerical, the first drive calculation unit stops the calculation process of performing the switching control of the first inverter and the second drive calculation unit continues the calculation process of performing the switching control of the second inverter when the determination unit determines that the determination data of the first calculation block between the first calculation block and the second calculation block is non-numerical, and the second drive calculation unit stops the calculation process of performing the switching control of the second inverter and the first drive calculation unit continues the calculation process of performing the switching control of the first inverter when the determination unit determines that the determination data of the second calculation block between the first calculation block and the second calculation block is non-numerical.

6. An electronic control device provided with a plurality of calculation blocks that calculate floating-point data, the electronic control device comprising:
   a storage configured to store calculation data items of the plurality of calculation blocks;
   a command value calculation unit configured to calculate a command value of a control amount for a control target based on the calculation data items of the plurality of calculation blocks;
   a determination value calculation unit configured to, before the command value calculation unit calculates the command value, (i) calculate addition data of calculation data items of at least two of the plurality of calculation blocks among the calculation data items stored in the storage, and (ii) calculate determination data obtained by subtracting the addition data from the addition data;
   a determination unit configured to execute, as a determination process, a process of determining whether the determination data is non-numerical before the command value calculation unit calculates the command value; and
   a processing unit configured to execute an initialization process on a calculation data item determined as being non-numerical among the calculation data items stored in the storage before the command value calculation unit calculates the command value,
   wherein the electronic control device is further configured to control the control target based on the command value, and
   wherein the control target is an actuator.

7. The electronic control device according to claim 6, wherein
   each of groups into which the plurality of calculation blocks are divided is provided as a partial command value calculation unit configured to calculate a partial command value for the control target based on a calculation data item of a calculation block included in the group,
   the command value calculation unit calculates the command value based on the partial command value calculated by each partial command value calculation unit,
   the determination value calculation unit calculates determination data of each partial command value calculation unit before the command value calculation unit calculates the command value,
   the determination process is a process of determining whether the determination data calculated in each partial command value calculation unit is non-numerical, and the processing unit executes the initialization process on the calculation data item of the calculation block included in the partial command value calculation unit determined as being non-numerical among the calculation data items stored in the storage.

8. The electronic control device according to claim 6, wherein
   the command value calculation unit continues controlling the control amount until the determination unit determines that the determination data is non-numerical in each of a plurality of control cycles that are consecutive, and
   the command value calculation unit stops controlling the control amount when the determination unit determines that the determination data is non-numerical in each of the plurality of control cycles.

9. The electronic control device according to claim 6, wherein
   the electronic control device is applied to a steering device.

10. A steering system comprising:
    the electronic control device according to claim 9, and
    the steering device.

11. The electronic control device according to claim 6, wherein
    the electronic control device is applied to a steering device,
    the control target is a motor that includes first and second stator winding groups and that generates a steering torque as the control amount,
    the steering device includes
       the motor,
       a first inverter electrically connected to the first stator winding group, and
       a second inverter electrically connected to the second stator winding group, the electronic control device further comprises
       a drive calculation unit that includes a first calculation block and a second calculation block, and is configured to (i) execute a calculation process of performing switching control of the first inverter based on the command value and a calculation data item of the first calculation block, and (ii) execute a calculation process of performing switching control of the second inverter based on the command value and a calculation data item of the second calculation block,
    the storage stores the calculation data item of the first calculation block and the second calculation block,
    the determination value calculation unit calculates determination data of the first calculation block and determination data of the second calculation block before the command value calculation unit calculates the command value,
    the determination unit determines whether each of the determination data of the first calculation block and the determination data of the second calculation block is non-numerical,
    the drive calculation unit stops the calculation process of performing the switching control of the first inverter and continues the calculation process of performing the switching control of the second inverter when the determination unit determines that the determination data of the first calculation block between the first calculation block and the second calculation block is non-numerical, and
    the drive calculation unit stops the calculation process of performing the switching control of the second inverter and continues the calculation process of performing the switching control of the first inverter when the determination unit determines that the determination data of the second calculation block between the first calculation block and the second calculation block is non-numerical.

12. The electronic control device according to claim 6, wherein the electronic control device is applied to a steering device, the control target is a motor that includes first and second stator winding groups and that generates a steering torque as the control amount, the steering device includes the motor, a first inverter electrically connected to the first stator winding group, and a second inverter electrically connected to the second stator winding group, the command value calculation unit includes a first command value calculation unit configured to calculate a first command value of the steering torque as the command value, and a second command value calculation unit configured to calculate a second command value of the steering torque as the command value, the electronic control device further comprises a first drive calculation unit that includes a first calculation block, and is configured to execute a calculation process of performing switching control of the first inverter based on the first command value and a calculation data item of the first calculation block, and a second drive calculation unit that includes a second calculation block, and is configured to execute a calculation process of performing switching control of the second inverter based on the second command value and a calculation data item of the second calculation block, the storage stores the calculation data item of the first calculation block and the calculation data item of the second calculation block, the determination value calculation unit calculates (i) determination data of the first calculation block before the first command value calculation unit calculates the first command value, and (ii) determination data of the second calculation block before the second command value calculation unit calculates the second command value, the determination unit determines whether each of the determination data of the first calculation block and the determination data of the second calculation block is non-numerical, the first drive calculation unit stops the calculation process of performing the switching control of the first inverter and the second drive calculation unit continues the calculation process of performing the switching control of the second inverter when the determination unit determines that the determination data of the first calculation block between the first calculation block and the second calculation block is non-numerical, and the second drive calculation unit stops the calculation process of performing the switching control of the second inverter and the first drive calculation unit continues the calculation process of performing the switching control of the first inverter when the determination unit determines that the determination data of the second calculation block between the first calculation block and the second calculation block is non-numerical.

* * * * *